(12) United States Patent
Harkham

(10) Patent No.: US 9,975,044 B2
(45) Date of Patent: May 22, 2018

(54) SYSTEM AND METHOD FOR SOCIAL GAMING

(71) Applicant: Gabriel Joseph Harkham, Raanana (IL)

(72) Inventor: Gabriel Joseph Harkham, Raanana (IL)

(73) Assignee: Ngage SporTek Ltd., Tel Aviv (IL)

( * ) Notice: Subject to any disclaimer, the term of this patent is extended or adjusted under 35 U.S.C. 154(b) by 0 days. days.

(21) Appl. No.: 14/806,460

(22) Filed: Jul. 22, 2015

(65) Prior Publication Data

US 2016/0354688 A1 Dec. 8, 2016

Related U.S. Application Data

(60) Provisional application No. 62/171,020, filed on Jun. 4, 2015, provisional application No. 62/194,850, filed on Jul. 21, 2015, provisional application No. 62/027,266, filed on Jul. 22, 2014.

(51) Int. Cl.
| | |
|---|---|
| *A63F 13/12* | (2006.01) |
| *A63F 13/35* | (2014.01) |
| *G07F 17/32* | (2006.01) |
| *A63F 13/795* | (2014.01) |
| *A63F 13/332* | (2014.01) |
| *A63F 13/211* | (2014.01) |
| *A63F 13/46* | (2014.01) |

(52) U.S. Cl.
CPC ............ *A63F 13/35* (2014.09); *A63F 13/332* (2014.09); *A63F 13/795* (2014.09); *G07F 17/32* (2013.01); *A63F 13/211* (2014.09); *A63F 13/46* (2014.09)

(58) Field of Classification Search
CPC .................................. A63F 13/10; A63F 13/12
See application file for complete search history.

(56) References Cited

U.S. PATENT DOCUMENTS

2003/0073471 A1* 4/2003 Varley .................... A63F 13/12 463/1
2008/0108437 A1* 5/2008 Kaarela ................... G07F 17/32 463/42

* cited by examiner

*Primary Examiner* — Omkar Deodhar
(74) *Attorney, Agent, or Firm* — Michael D. Eisenberg

(57) ABSTRACT

An aspect of some embodiments of the present invention relate to an application programming interface (API) software integrated with a software of an electronic game, the API software being configured being stored in non-volatile memory module of a computing device and for being run by a processor of the computing device, the API being configured for causing the computing device to connect to a server configured for hosting a competition and creating a completion on the server. The competition comprises at least one of: a gaming session between two players, a gaming session between more than two players, and a tournament.

19 Claims, 26 Drawing Sheets

SYSTEM AND METHOD FOR SOCIAL GAMING

CROSS-REFERENCES TO RELATED APPLICATIONS

The present application claims priority from of U.S. Provisional Patent Application 62/027,266 filed on Jul. 22, 2014, U.S. Provisional Patent Application 62/171,020 filed on Jun. 4, 2015, and U.S. Provisional Patent Application 62/194,850 filed on Jul. 21, 2015, all of which are hereby incorporated herein by reference in their entirety.

TECHNICAL FIELD

The present invention, in some embodiments thereof, relates to electronic gaming, and more specifically for software and hardware for implementing social features for electronic gaming.

BACKGROUND OF THE INVENTION

The field of electronic gaming relates to gaming for stationary and mobile computing devices, such as desktop and laptop computers, mobile phones, tablets, stationary and portable consoles.

Single player and multiplayer games are released daily for purposes of entertainment. Due to the pervasive nature of wired and wireless communications, player communities have been built around some multiplayer games, so that a social aspect has developed around electronic gaming. Moreover, official and unofficial competitions in electronic games take place frequently, enabling players to compete for a prize and enabling advertisers to advertise their products and/or services in the tournaments.

BRIEF SUMMARY OF EMBODIMENTS OF THE INVENTION

An aim of the present invention is to enhance the social gaming experience for players, both in single-player and multiplayer games.

For this purpose, some embodiments of the present invention relate to systems and methods for matching players to play single-player or multi-player games against each other. Some embodiments of the present invention relate to systems and methods for organizing and running tournaments to which a plurality of players participate.

Some aspects of some embodiments of the present invention relates to games that require to be downloaded on the user's gaming device, in order to be played. In these embodiments, an application programming interface (API) is installed on the user's gaming device to enable the user to play any game as a challenge against another player. In these embodiments, an API is installed on the user's gaming device to enable the user to participate in a tournament.

A software development kit (SDK) is provided to the game's developer in order to enable game developers to integrate the API into the game software. In this manner, the API enables communication between the game and a server, and enables the users to play against each other and/or participate in tournaments. It should be noted that the SDK is not game-specific, but can be integrated into the code of any game.

Another aspect of some embodiments of the present invention relates to games that can be played via websites (such as HTML games), and do not require to be downloaded on the user's electronic device. An API is installed at the location storing the game's code to enable communication between the game and a server which handles the matches between players and/or the tournaments. A software development kit of the present invention enables developers to integrate the API into any game.

Games may be played for entertainment purposes, or for currency. The currency may include in-game currency that can be used to redeem certain products or services from a third party organization. Optionally the currency includes a real currency, which can be cashed in by the player. Optionally, the currency includes a third party currency that can be used for redeeming products or services for a specific third party only.

Therefore, an aspect of some embodiments of the present invention relates to an application programming interface (API) software integrated with a software of an electronic game, the API software being configured being stored in non-volatile memory module of a computing device and for being run by a processor of the computing device. The API is configured for causing the computing device to: receive a request from a user associated with the computing device to play the electronic game against at least one second player; send the request to a server which is configured for matching the user against the at least one second player and hosting a competition between the first player and the at least one second player; receive data from the server and generating one or more screens indicative of the received data, the one or more screens being configured for being displayed on a display associated with the computing device; receive an instruction from the server and/or from the lounge application to run the game software; run the game software in response to the instruction; extract a score achieved by the user at an end of a playing session; send the score to the server. A code of the API software is not game specific and is configured for being integrated with a code of any game configured for running on the processor of the gaming device. The competition comprises at least one of: a gaming session between two players, a gaming session between more than two players, and a tournament.

Optionally, the API is configured for causing the computing device to: display a virtual button on a screen generated by the game software; connect to the server, upon a selection by the user of the virtual button.

Optionally, the computing device is a portable gaming device which comprises a motion detection unit and motion identifier software. The motion detection unit is configured for detecting one or more parameters relating of the motion of the gaming device and outputting motion data indicative of the one or more parameters. The motion identifier software is configured for receiving the motion data from the motion detector, processing the motion data to determine whether a predetermined motion occurs and generating a control signal when the predetermined motion is identified. The API is configured for causing the computing device to: activate the motion identifier software for running on the processor when the game software runs on the processor; and connect to the server, upon generation of the control signal.

Optionally, the predetermined motion comprises at least one of: a translation of the portable gaming device, a rotation of the portable gaming device, and a motion pattern comprising a plurality of translations and/or of rotations of the gaming device.

Optionally, the computing device is a gaming device proximal to the first player and the one or more screens are configured for being displayed on a display associated with the gaming device.

Optionally, the computing device is a second server configured for being accessed remotely by the first player via a gaming device of the user, wherein the one or more screens are configured for being displayed on a display associated with the first player's gaming device.

Another aspect of some embodiments of the present invention relates to a system for enabling a first player to play an electronic game against at least one second player. The system comprises API software as described above, configured for being stored in and run by a plurality of computing devices, to create a plurality of API instances, and the server described above.

Optionally, the server comprises a server processor and a server non-volatile memory module. The server processor is configured for: matching the first player against the at least one second player in a competition, according the request sent by a first computing device associated with the first player via a first instance of the API software; receiving the score of the first player from the first computing device and for receiving at least one score of the at least one second player from at least one second computing device associated with the at least one second player via at least a second API instance, for comparing the received scores, and for determining a winner according to the received scores; transferring currency between the first player and the at least one second player, according to the determination of the winner. The server non-volatile memory module is configured for storing: game options data, configured for being created for each gaming session by the server processor upon matching the players, according to one or more details in the first player's request; profiles of the first player and of the at least one second player, configured for being updated by the server processor upon currency transfer.

Optionally, the game options data comprises one or more data pieces relating to one or more settings of the game chosen for the competition, such that the server is configured for sending the one or more data piece to each computing device associated with each player, so as to cause the game software to run on each computing device's processor according to chosen settings.

Optionally, the game options data comprises one or more data pieces relating to at least one of: an amount of currency wagered by the user and the one or more players, a difficulty level of the game, a map of the game, a number of turns to be played.

Optionally, the server processor is configured for matching the first player with one or more random players and starting the competition.

Optionally, at an end of the competition, the server is configured for generating a signal indicative of the competition's end and for sending the signal to computing devices associated with the players. Responsive to the signal, each of computing devices is configured for generating data indicative of a prompt image, the prompt image being configured for being displayed to the players for enabling at least one of the players to request a rematch competition.

Optionally, when the prompt is selected by the first player, the first computing device is configured for opening a request window to enable the user to change at least one game option for the rematch competition. When the user completes filling the request window, the first computing device is configured for sending the server a rematch request via the first API instance according to the filling of the request window. The server is configured for sending the rematch request to the at least one second computing device.

Optionally, the first computing device running the first API instance is configured for enabling the user to request from the server to compete against a predetermined friend associated with the user.

Optionally, the first computing device running the first API instance is configured for enabling the first player to request from the server to compete against the predetermined friend choosing a game that is not installed in the friend's computing device.

Optionally, a friend's computing device running a friend's API instance is configured for determining whether the chosen game is present in the friend's computing device, and for sending the server a response to the user request along with information regarding a presence of the chosen game. If the server receives an acceptance to the request and the information indicates that the chosen game is not present in the friend's computing device, the server is configured for sending to the friend's computing device a link to a location at which the chosen game can be downloaded.

Optionally, the server comprises a server processor and a server non-volatile memory module. The server processor is configured for: performing an intake of a plurality of players by processing requests sent by the plurality computing device running corresponding API instances, and accepting or rejecting each request based on at least one predetermined instruction; receiving the scores of the accepted players, sent by computing devices associated with the accepted players and running corresponding API instances, comparing the scores, and determining one or more winners according to the scores; sending one or more notifications to the one or more winners via respective API instances or via an external communication system, to inform the winners that a prize is due to each winner, the notification containing information on how to claim the prize.

A further aspect of some embodiments of the present invention relates to a system for enabling a user to play an electronic game against one or more players. The system is configured being stored in non-volatile memory module of a computing device and for being run by a processor of the computing device. The computing device being a portable gaming device which comprises a motion detection unit configured for detecting one or more parameters relating of the motion of the gaming device and outputting motion data indicative of the one or more parameters. The system comprises API software and motion identifier software. The API software is configured being stored in non-volatile memory module of the computing device and for being run by the processor of the computing device. The API being configured for causing the computing device to: receive a request from a user associated with the computing device to play the electronic game against at least one second player; send the request to a server which is configured for matching the user against the at least one second player and hosting a competition between the first player and the at least one second player; receive data from the server and generating one or more screens indicative of the received data, the one or more screens being configured for being displayed on a display associated with the computing device; receive an instruction from the server to run the game software; run the game software in response to the instruction; extract a score achieved by the user at an end of a playing session; send the score to the server. The motion identifier software configured for: being activated by the API for running on the processor when the game software runs on the processor; causing the processor to receive the motion data from the motion detector; causing the processor to process the motion data to determine whether a predetermined motion occurs; upon identifying the predetermined motion, causing the processor to activate the API software to connect to the server. The competition comprises at least one of: a gaming session between two players, a gaming session between more than two players, and a tournament.

Optionally, a code of the API software is not game specific and is configured for being integrated with a code of any game configured for running on the processor of the gaming device.

Optionally, the predetermined motion comprises at least one of: a translation of the portable gaming device, a rotation of the portable gaming device, and a motion pattern comprising a plurality of translations and/or of rotations of the gaming device.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
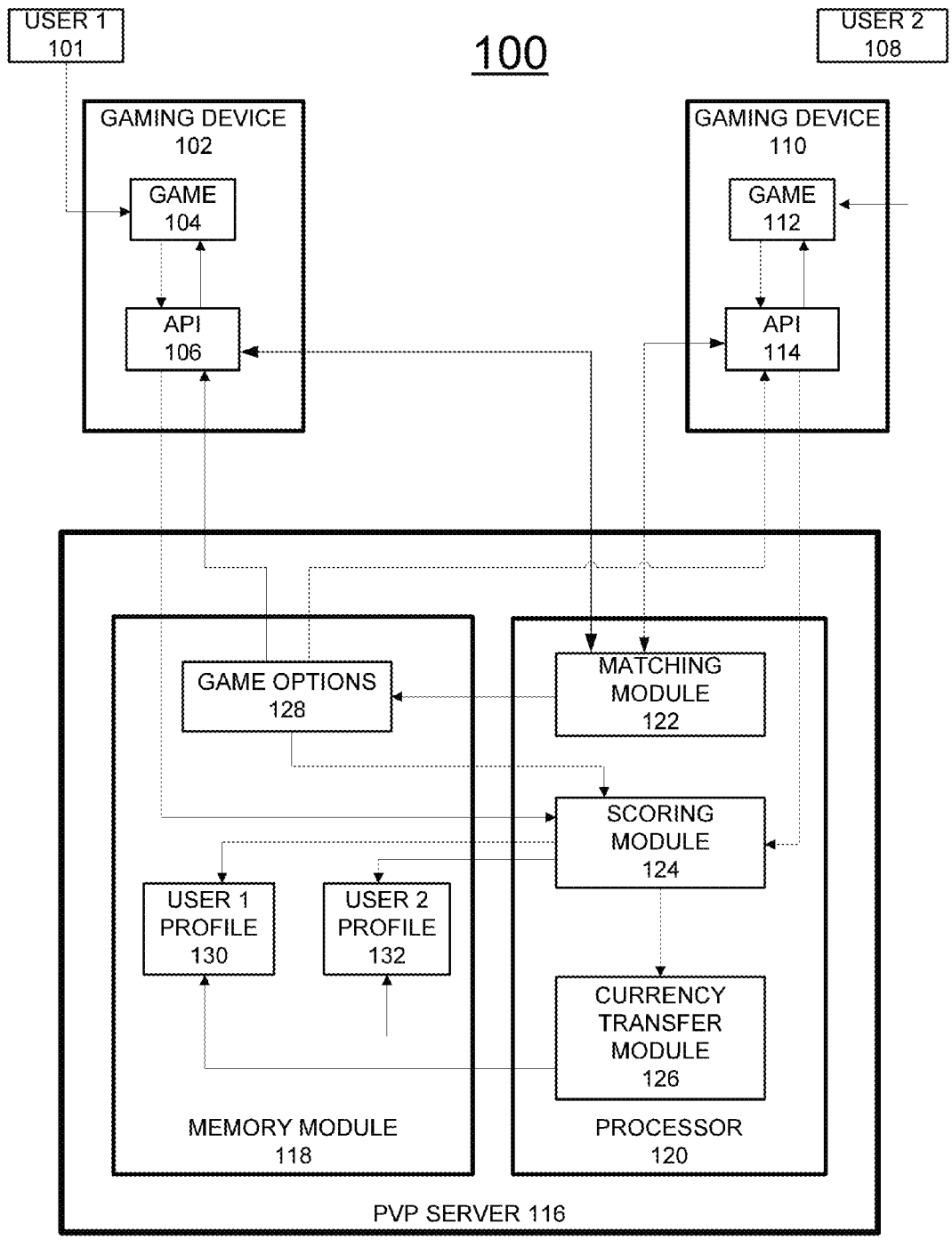
FIG. 1 is a box diagram showing a system for implementing social gaming, wherein games are installed on users' electronic devices, according to some embodiments of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Reference is now made to FIGS. 1a and 1b, which are box diagram showing different embodiments of a system 100 for implementing social gaming, wherein games are installed on users' electronic devices, according to some embodiments of the present invention.

The system 100 includes an application programming interface (API) software 106 that is installed in the gaming device 102 of a first user 101 and is configured for running on the gaming device 102. The gaming device is any electronic device having a processor for running software, non-volatile memory for storing software, and a communication unit configured for exchanging data with a server. The gaming device may be a smart phone, a computer (desktop and laptop), a game console, a portable game console, a tablet, etc.

The instances 106 and 114 of the API are configured to enable the users 101 and 108 respectively to compete against each other in an electronic game, to enable the users to interact with a server 116, and to enable the gaming devices 102 and 110 to exchange data with the server 116. The code of the API is integrated in the code of a game 104 installed on the gaming device 102. The API is configured for receiving instructions from the users, transmitting the instructions to the server, receiving data from the server according to the user instructions, and displaying the data to the users. The code of the API is not game-specific and is configured for being easily integrated into the code of any game.

The API 106 is activated when the user 101 starts the game application 104 and selects a virtual button generated by the API on the game's title screen. In some embodiments of the present invention, once the connection between the gaming device and the server, the API keeps running in the background to maintain the connection with the server and keep the player logged into the server, even when the game even when the game ends and stops running on the processor.

Figure 11:
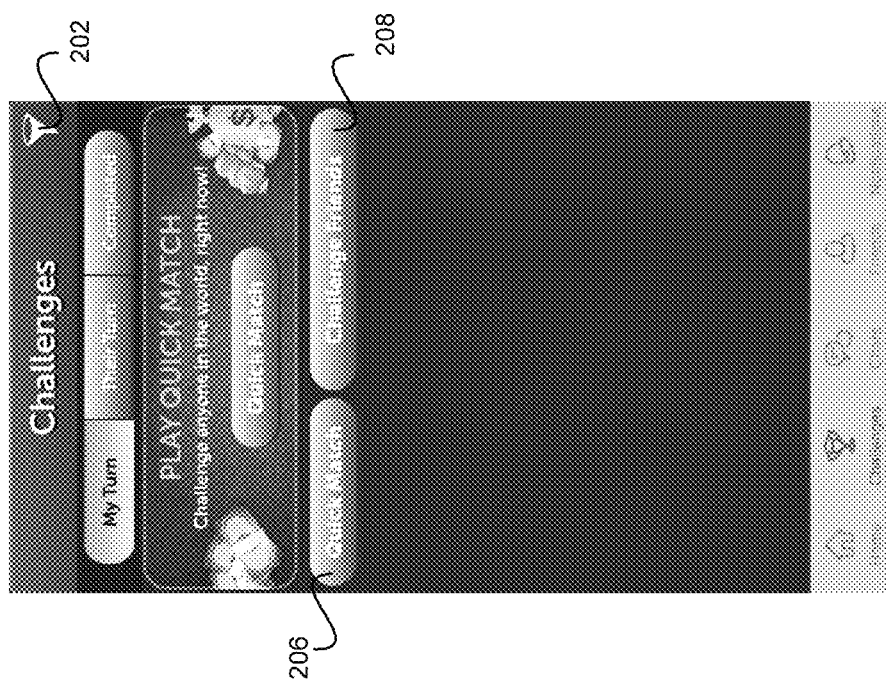
FIGS. 10-26 are screenshots illustrating features of the present invention described by FIGS. 1-9, according to some embodiments of the present invention.
Figure 10:
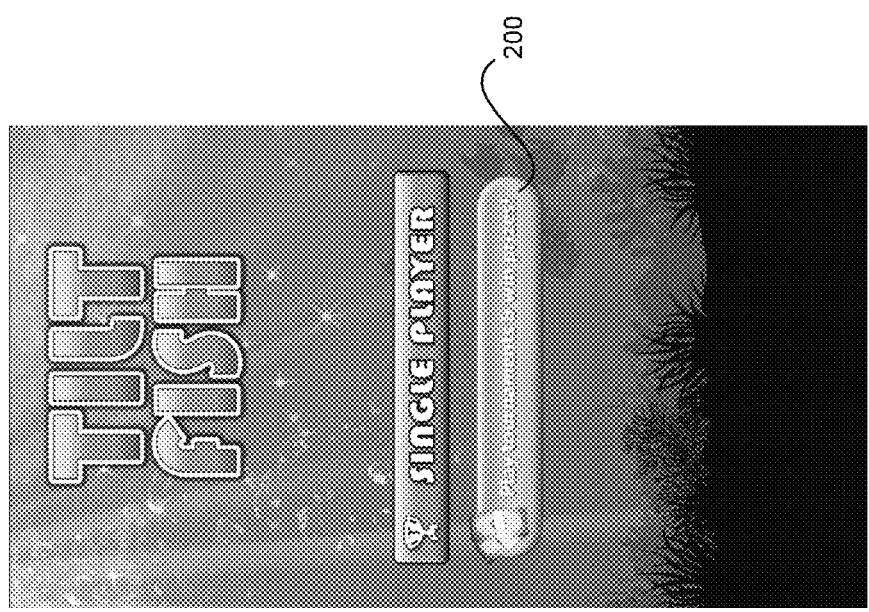

FIG. 10 is a screenshot illustrating a title screen of a game with which the API is integrated. The title screen has a virtual button 200 which can be pressed to activate the API, for enabling the user to request from the server to play against other users. FIG. 11 is a screenshot of a screen of the API. The screenshot has buttons that allow a user to play against other users. A thumbnail 202 shows an image indicative of the game that the player wishes to play. By selecting the thumbnail 202 (by touching the screen at the thumbnail's location, or by moving a pointer to the thumbnail's location and pressing a button), the player is presented with a list of available games, and may choose any game. When the player alters his/her choice, the thumbnail indicative of the chosen game appears on the screen. Once a quick match or a challenge is started, the API activates the game application, and the game application runs on the user's device.

The API software enables communication between the gaming device and a player-versus-player (PVP) server 116. The PVP server 116 includes or is associated with a processor 120 and a memory module 118. The memory module is configured for storing user profiles 130 and 132, gaming options 128, and software for managing a plurality of games and a plurality of matches. The processor 120 is configured for running the software and may operate as a matching module 122, a scoring module 124, and a currency transfer module 126.

When the users 101 and 108 wish to play a game against each other, they press a button to instruct the API to generate a match request and cause their gaming devices to send the requests to the PVP server 116. The processing module 120 receives the requests and processes them via a matching module software 122, to set up a gaming session in which the two users play against each other. In some embodiments of the present invention the requests from the users include data about gaming options 128, which may include information such as the number of turns the users wish to play, a wager that the users wish to make against each other, a handicap granted from one user to the other, a level of difficulty of the game, one or more maps of the game in which the users wish the game to played, etc. The gaming options data 128 is stored in the server's memory module 118. When the gaming session is started, the gaming options data 128 is sent to the gaming devices 102 and 110 via the API's, to cause the gaming device to run the game applications 104 and 112 according to the game options that the users agreed upon.

Once the users have finished playing their turns, the game scores are sent to the server's processor 120 via the API software instances 106 and 114. The processor 120 is configured to operate as a scoring module 124 for processing the scores along with the game options data 128, to determine the winner and to determine an amount of currency that needs to be transferred from the losing user to the winning user. Once the winner is determined, the user profiles 130 and 132 are updated, so that a history of the users' matches is updated. The processor finally operates as a currency transfer module 126 to execute a currency transfer from the losing user to the winning user. Once the currency transfer is performed, the user profiles 130 and 132 are updated to include the current amount of currency associated with each user.

It should be noted that the in the communication between the gaming devices 102 and 110 and the server 116, the server may identify the users in any known manner. For example, the server may identify the users by requesting a username and password from registered users. In another example, a user may be unregistered, and the server identifies a unique identification of the gaming device, creates a guest profile and associates the gaming device with the created guest profiles. In this manner, a user's record is kept even though the user has not registered. Once the user registers, the guest profile associated with the user's device is converted to a new user profile created by the user and associated with the user, independently of the device.

Figure 2:
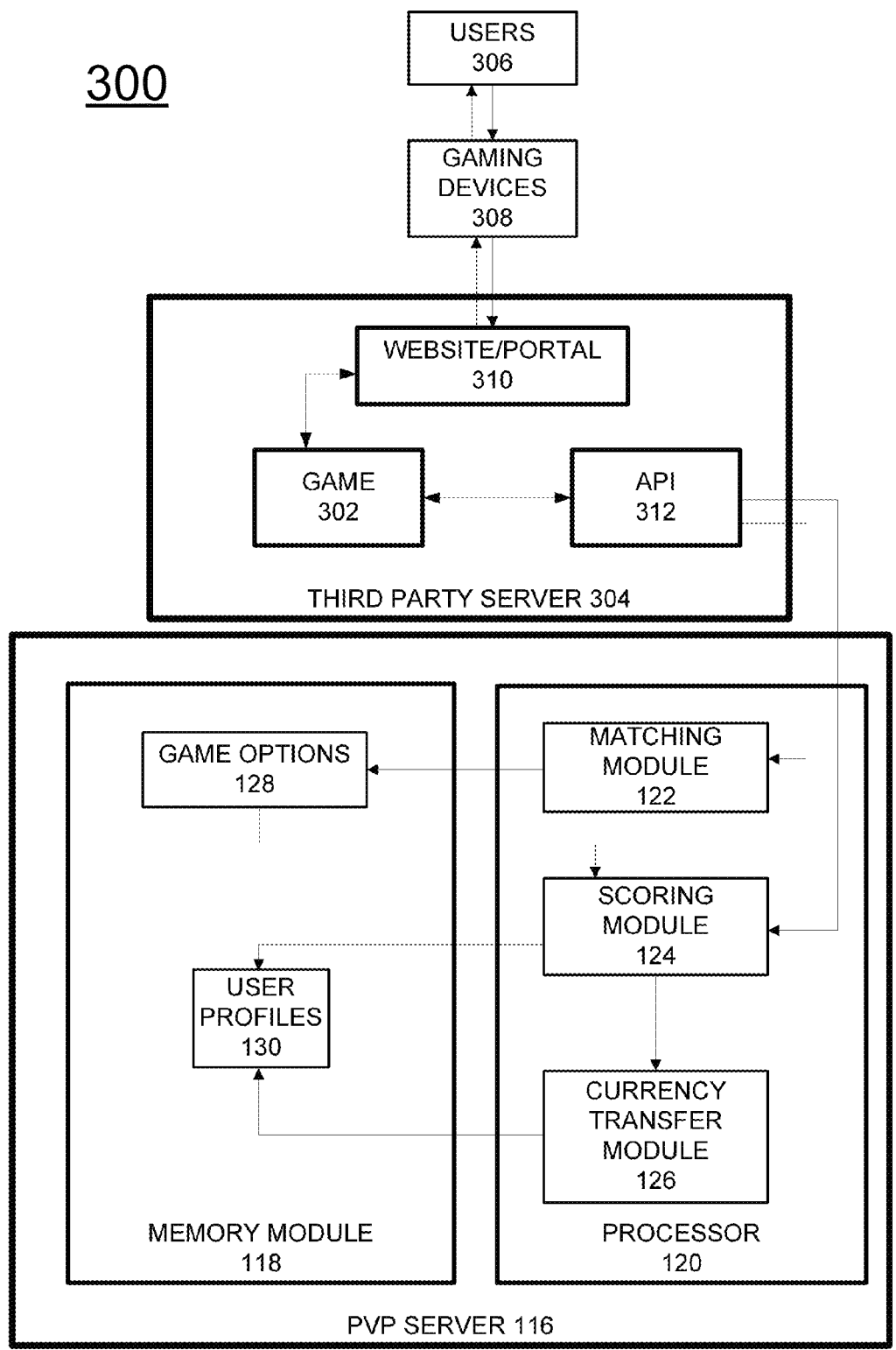
FIG. 2 is a box diagram showing a system for implementing social gaming, wherein games are accessed via a website or a network's portal, according to some embodiments of the present invention.

FIG. 2 is a box diagram showing a system 300 for implementing social gaming, wherein games are accessed via a website or a network's portal, according to some embodiments of the present invention.

The system 300 relates to games that are played remotely and are not required to be installed on the user's gaming device. In the embodiment of FIG. 2, the game software 302 is stored on a third party server 304, and is configured for being played remotely by users 306. Each user 306 has a respective gaming device 308, and connects to the game server 304 via a network through a website or portal 310. The website or portal 310 enable the player to cause an instance of the game software to be run on a processor of the third party server 304. The API 312 is installed in the third party server 304 and the game 302 is integrated with the API 312, as explained above in the description of FIG. 1.

The API 312 enables the third party server 304 to connect to the PVP server 116 described above. The server 116 stores user profiles 130, game options 128, and performs processing for matching users, scoring matches, and transferring currency, as explained above, in the description of FIG. 1.

It should be noted that instead of the being hosted in the third party server or in addition to being hosted in the third party server, the game software may be stored in the PVP server 116, and may be accessible to user via a website or a network/internet portal. In such an embodiment, the API code is also stored in the server 116, runs on the processor of the PVP server and provides communication between the game and the other elements of the server 116 described above.

Figure 3:
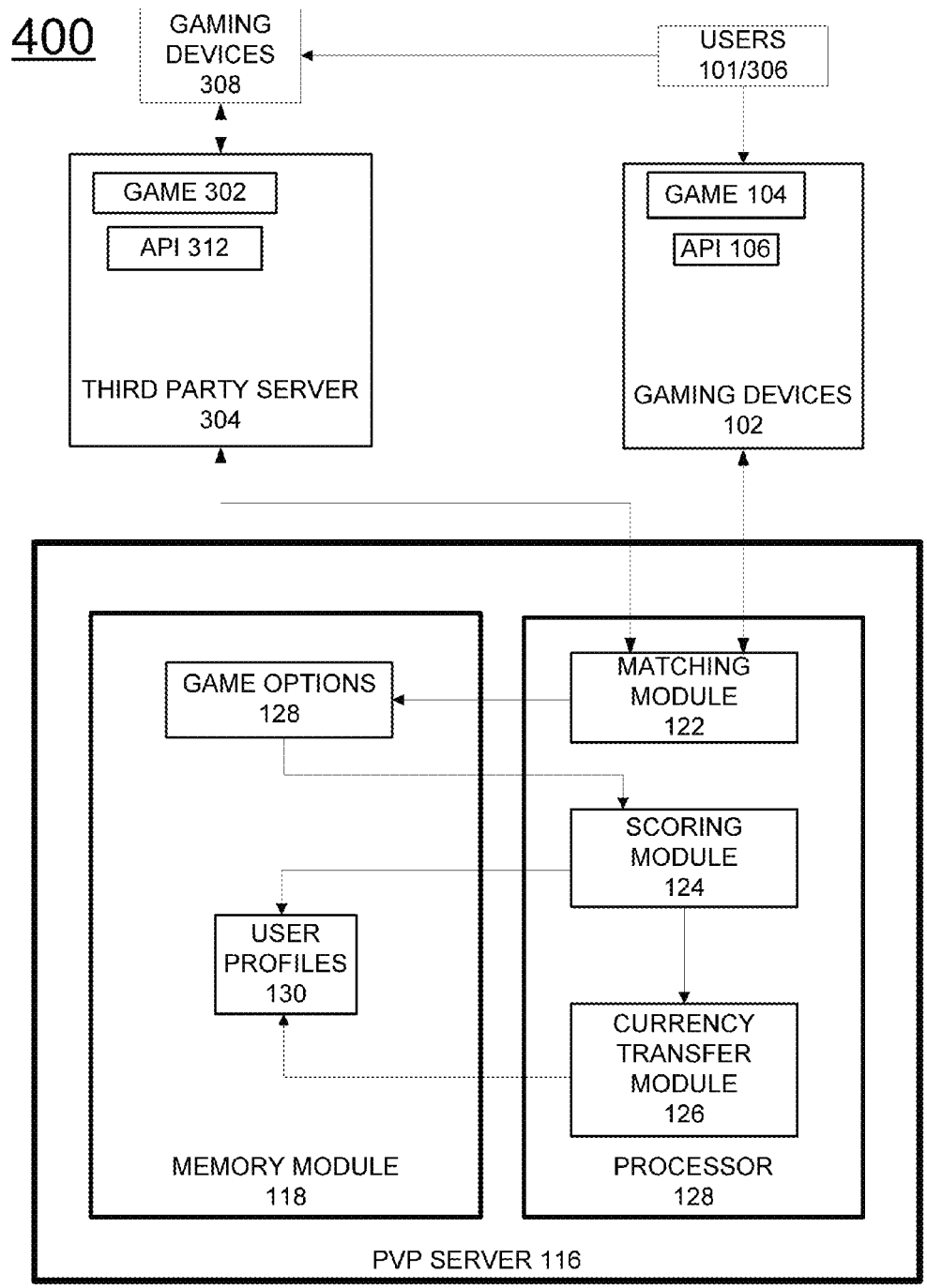
FIG. 3 is a box diagram showing a system for implementing social gaming, for enabling the execution of multi-platform gaming between players, according to some embodiments of the present invention.

FIG. 3 is a box diagram showing a system 400 for implementing social gaming, for enabling the execution of multi-platform gaming between players, according to some embodiments of the present invention.

The system includes, a website/portal application 310, an API 106, an API 312, and a server 116. The code of API 106 is integrated with the code of game 104 configured for being installed in and being run on gaming devices associated with a user 101. The code of the API 312 is integrated with code of the game 302 and is configured for being installed in and being run on a third party server 304 accessible to a user 306 via a device 308 associated with the user 306. The APIs connect the game applications to the PVP server 116 and enable users to communicate with the server, as explained above. In some embodiment of the present invention, the game software 104 and 302 may be software of a single game ported for different computing systems. The system 400 enables users having the different ports of the same game to play against each other.

Figure 4:
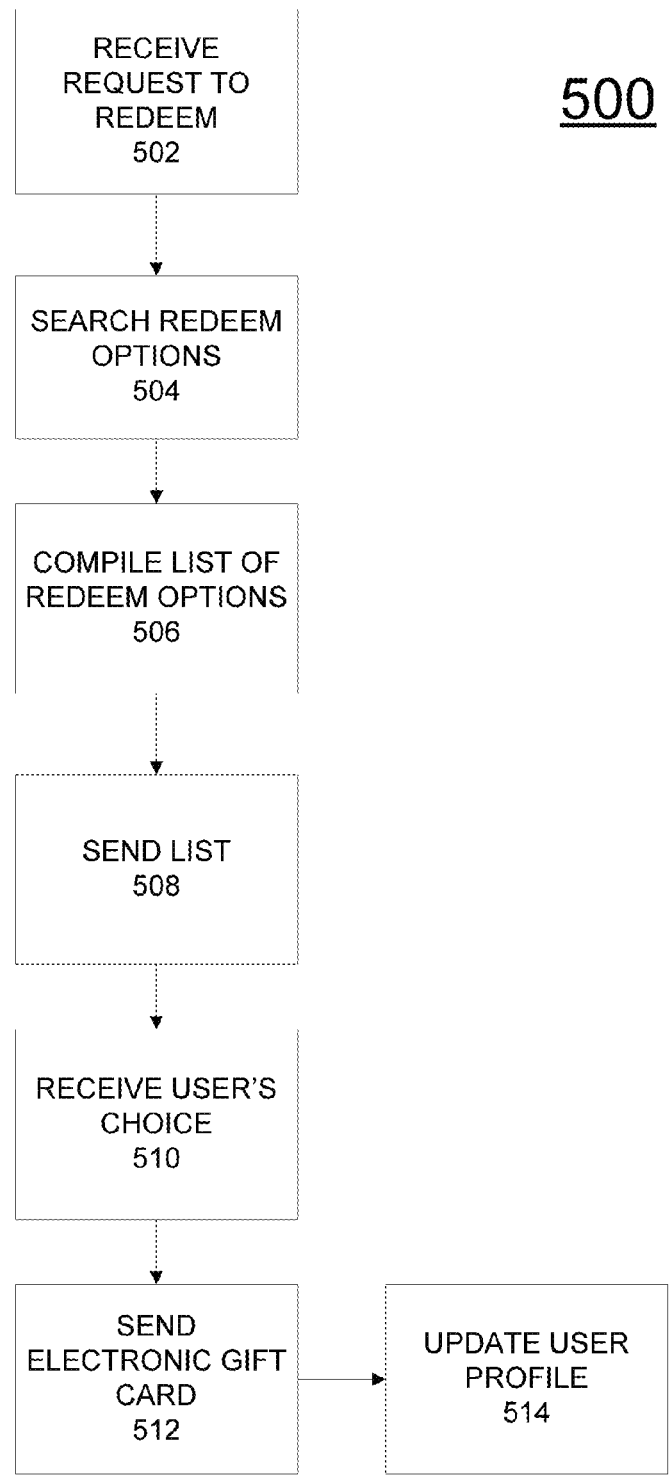
FIG. 4 is a flowchart illustrating a method of the present invention, for enabling a user to redeem a gift card via the system of the present invention.

FIG. 4 is a flowchart 500 illustrating a method of the present invention, for enabling a user to redeem a gift card via the system of the present invention.

In some embodiments of the present invention, users may play against each other in matches or tournaments for game currency that can be redeemed for a prize, such as a gift card to be spent at a certain third party entity, or another type of prize. In such embodiments, the user can access a screen which enables the user to redeem the prize.

In the method of the flowchart 500, the server receives from a user's device a request to redeem a prize, at 502. At 504, the server searches for prizes that are redeemable by the user, based on the currency amount associated with the user. At 506, the server compiles a list of prizes that are redeemable by the user, and at 508 the server sends the list to the user's device for being shown to the user.

At 510, the server receives the user's choice of the prize from the user's device. At 512, the server sends an electronic gift card or another prize to a virtual mailbox of the user. The electronic gift card may include a unique code to be typed on the third party's website for receiving the gift, a file to be uploaded on the third party website for receiving the gift, or a unique link to a website which enables reception of the gift. At 514, the server updates the user's profile by subtracting the game currency used for redeeming the prize from the total amount of game currency associated with the user. Optionally, information about the prize chosen by the user is stored in the user's profile. This information may be used for analyzing the user's preference in prizes and for enabling focused advertisements of products that may interest the user to be sent or shown to the user.

Figure 25:
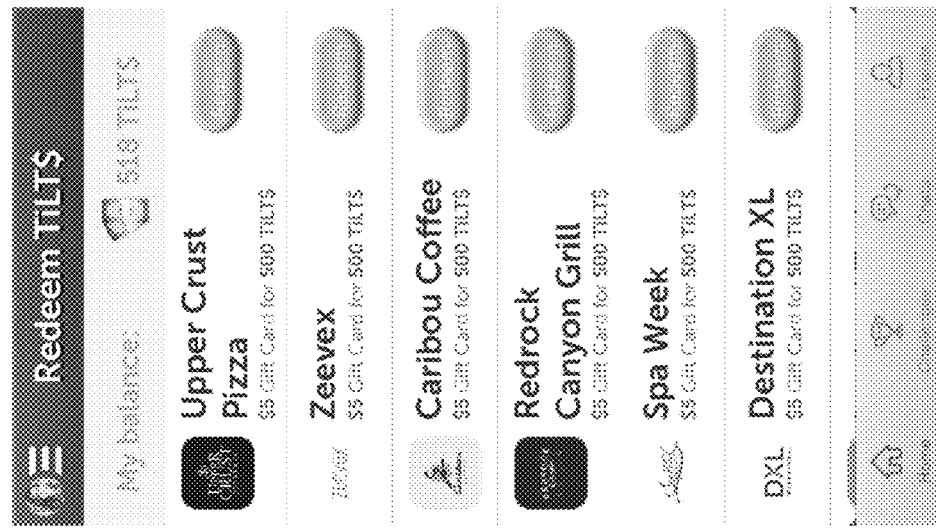
Figure 24:
Figure 26:
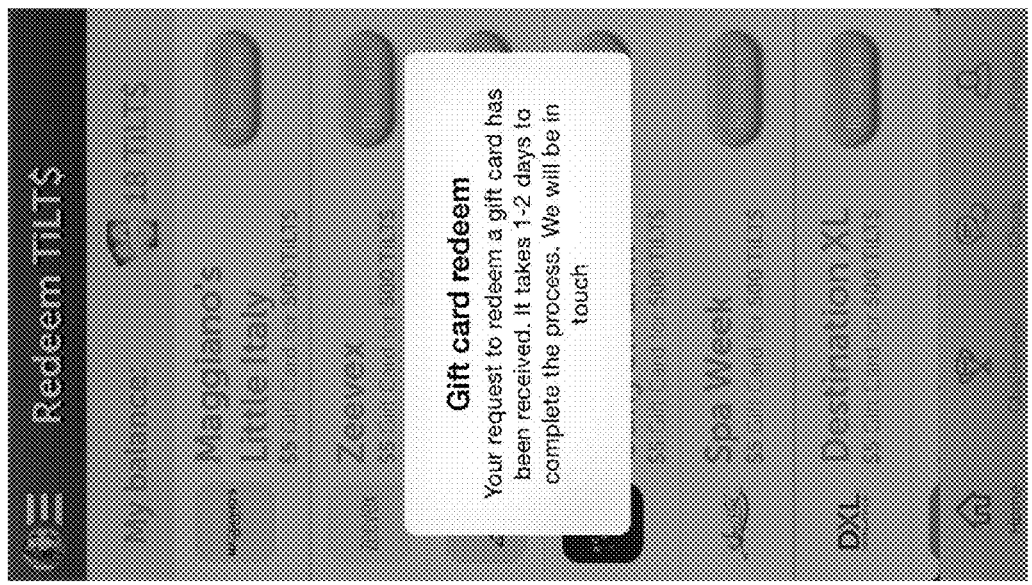

A screenshot showing a screen that enables the user to redeem prizes is shown in FIG. 24. A screenshot showing a list of prizes that may be redeemed by the user is shown in FIG. 25. A screenshot showing a message confirming receipt of the request to redeem a desired prize is shown in FIG. 26.

Figure 5A:
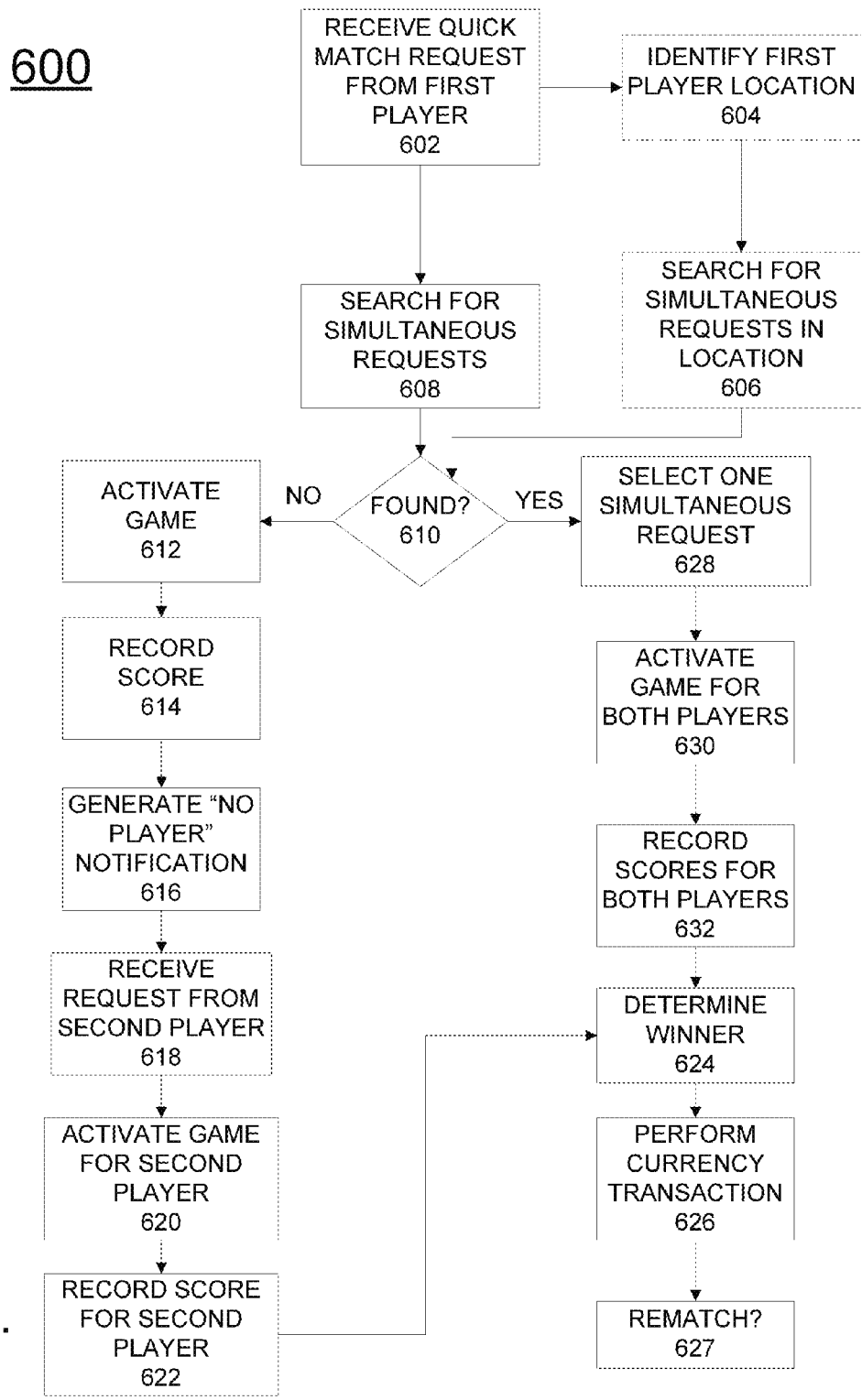
FIG. 5a is a flowchart illustrating a method of the present invention, for managing a quick match between two players, wherein the server performs the matching.

FIG. 5a is a flowchart 600 illustrating a method of the present invention, for managing a quick match between two players. The method of FIG. 5a is configured for being performed by the PVP server 116 of FIGS. 1-3.

A quick match is a gaming session in which two or more players compete against each other. The currency exchanged in the quick match is not redeemable for prizes, but may be used in the game to receive some in-game benefits, or may be used to determine a player's ranking. In the quick matches, the gaming options are fixed.

At 602 the server receives a request to join a quick match from a first player. At 608, the server searches for other requests that are made within a certain time interval. Optionally, the request includes the first player's location, which is identified at 604. In such an embodiment, the server searches for requests in a location that is proximal to the location of the first player at 606.

At 610, a check is made to determine if other requests have been found within the time interval. Optionally, if no other requests have been found in the time interval, the server returns generates a no response message and returns the player to a screen of the API which allows the player to request to play a game against other players. Alternatively, if no requests have been found within the time interval, the server sends the third party server or the user's device a signal for causing the activation of the game, at 612.

At 614, after the first player has played, the first player's score is recorder by the server. At 616, a notification is generated to be sent to the player's device to inform the first player that no player is available, and that the first player's score will be compared with the score of another player after the other player plays.

At 618, the server receives a quick match request from a second player. At 620, the server sends a signal to the second player's device or to the third party server which the second player is connected to, to activate the game. At 622, the second player's score is recorded. At 624, the score of the first and second player are compared and a winner is determined. At 626, a transfer of currency is performed from the loser to the winner. Optionally, at the end of the game, the server's scoring module sends to the API data indicative of the game's end, and, responsive to the end game data, the API of each player displays a prompt to enable the players to request a rematch at 627. If a player decides to request a rematch, the player is given the opportunity to change the gaming options for the rematch. Once a game has been played between two players, the players are given a prompt (via a virtual button) to add the other player as a friend in a friend's list. Friends may challenge each other to play one or more games, according to game options of their choice.

If at 610 a request from a second user is found within the time period, the server selects one of the requesting users to match against the first user at 628. In a variant, the server selects the second player randomly. In another variant, the server selects a player whose ranking is close to the ranking of the first player.

Figure 5B:
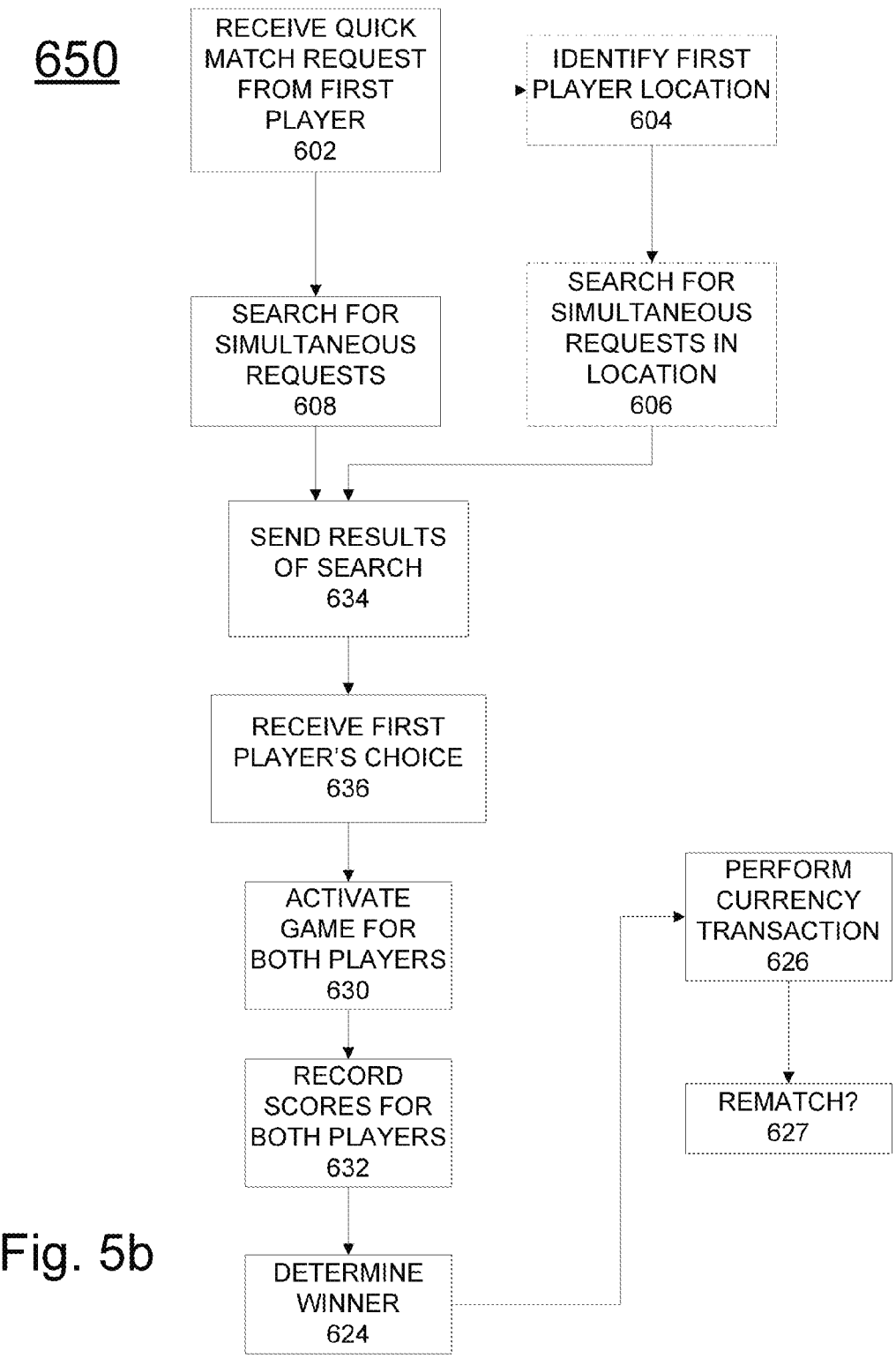
FIG. 5b is flowchart illustrating a method of the present invention, for managing a quick match between two players, wherein a player can choose his opponents from a list of players provided by the server.

In yet another variant shown in FIG. 5b, profiles of the players that have been found are displayed to the first player at 634, either together in a list, or one by one. In the latter case, the player may scroll the screen to view each profile. At 636, the player's choice of another player to play against is received by the PVP server. Once the second player has been selected, the server sends the devices of the players and/or the third party server(s) to which at least one of the players is connected a signal to activate the game, at 630. At 632, the scores of the two players are recorded, and at 624 the winner is determined. A currency transaction from the losing player to the winning player is performed at 626, and a prompt for a rematch is generated at 627.

Figure 12:
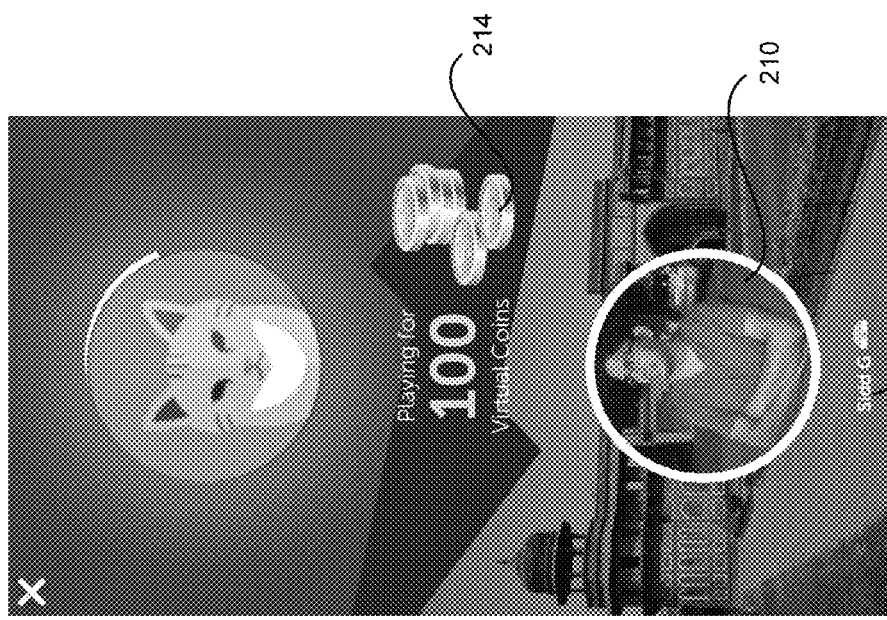
Figure 15:
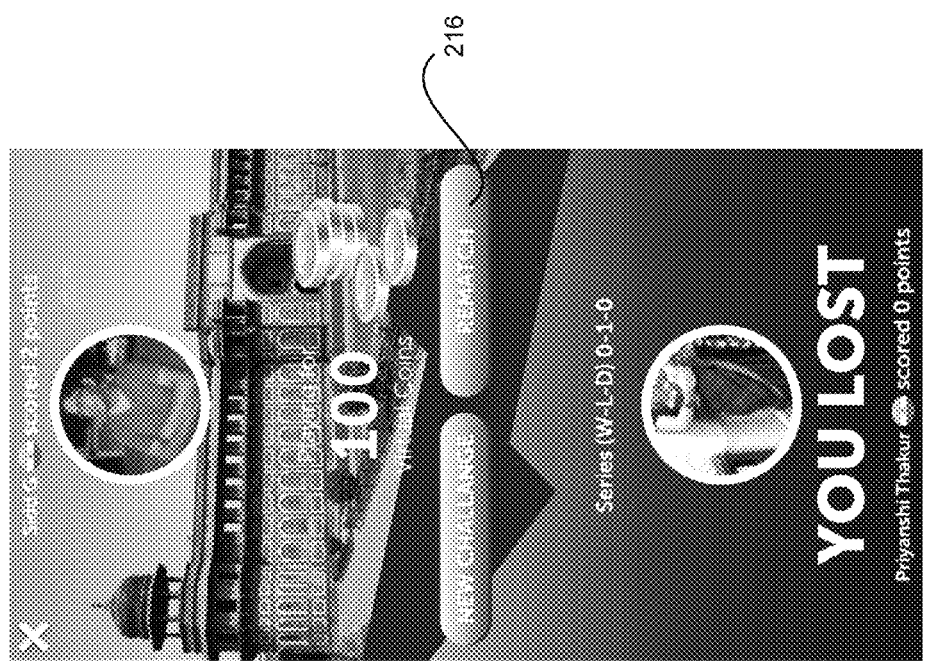
Figure 14:
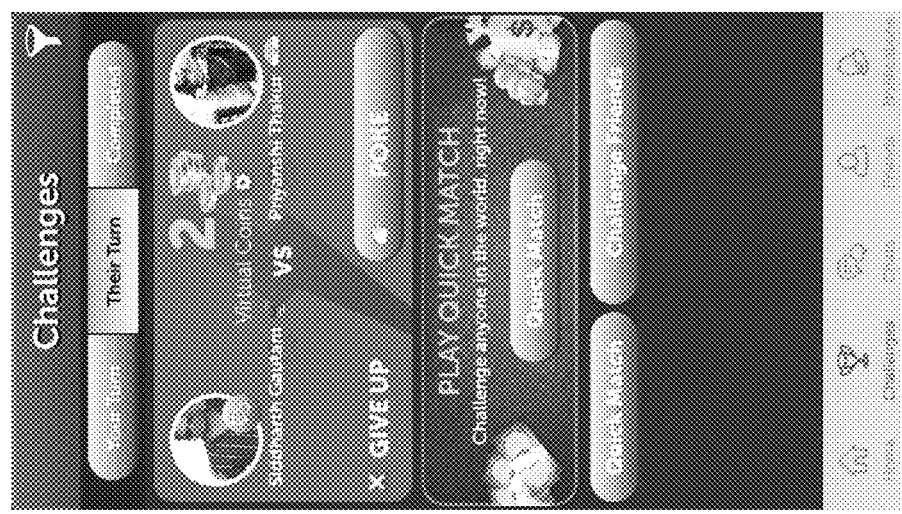
Figure 17:

Regarding the embodiments described in FIG. 5a, FIG. 11 shows a screenshot in which a first virtual button 206 enables the user to request a quick match, while a second virtual button 208 enables the user to request a challenge against a friend. FIG. 12 is a screenshot illustrating an image that is displayed when the first player is waiting for another player to be matched against the first player in a quick match. The screenshot of FIG. 12 shows an icon 210 representative of the first player, text 212 spells the first player's name, while the middle section 214 specifies the amount and type of currency that is being wagered in the quick match. FIG. 15 is a screenshot showing the result of quick match or a challenge, in which a virtual button 216 enables the first player to request a rematch.

Figure 6:
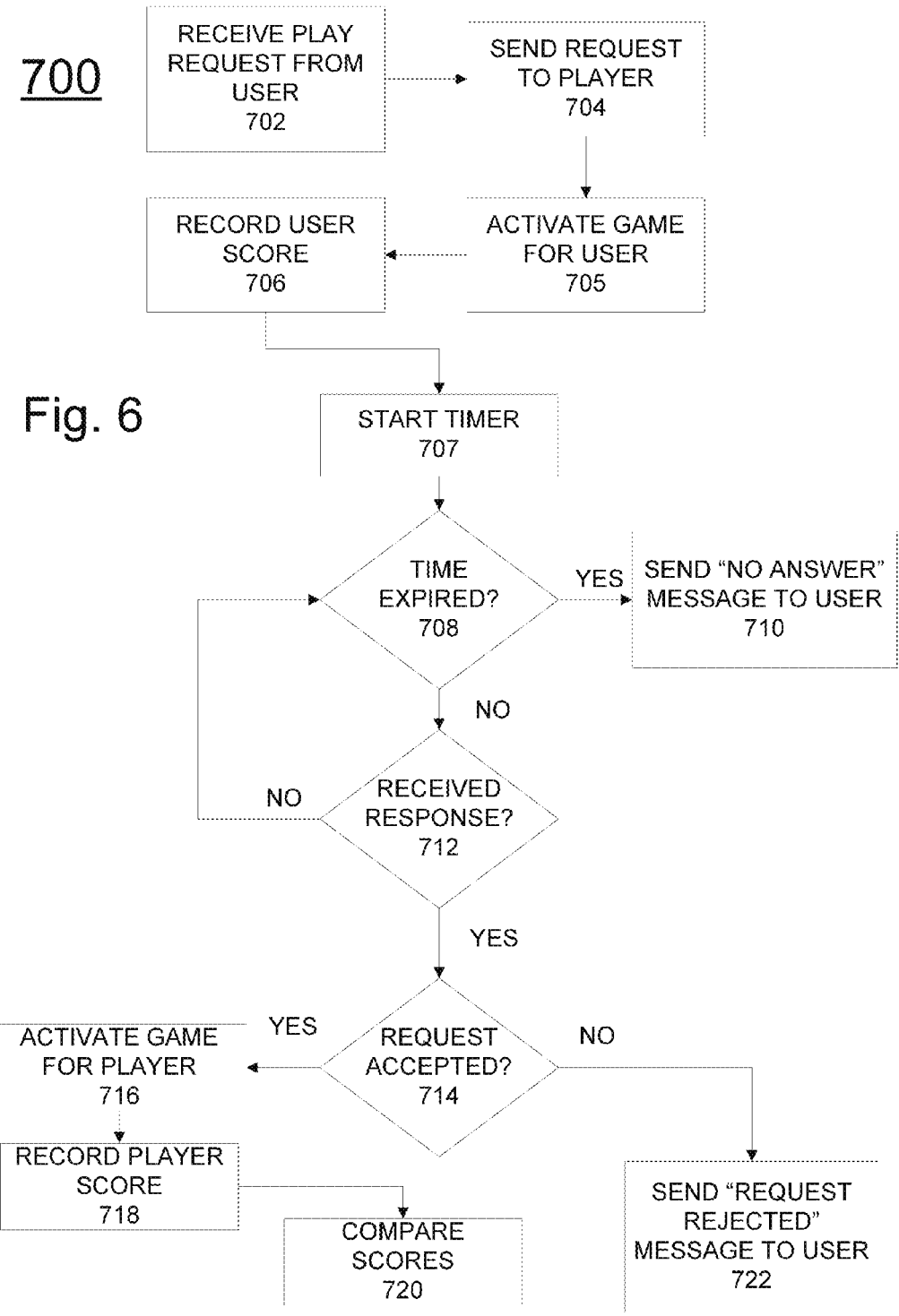
FIG. 6 is a flowchart illustrating a method of the present invention, for enabling a challenge to be communicated from one user to another user.

FIG. 6 is a flowchart 700 illustrating a method of the present invention, for enabling a challenge to be communicated from one user to another user. The method of the flowchart 700 is performed by the server 116 of FIGS. 1a, 1b, 2, and 3.

Figure 13:
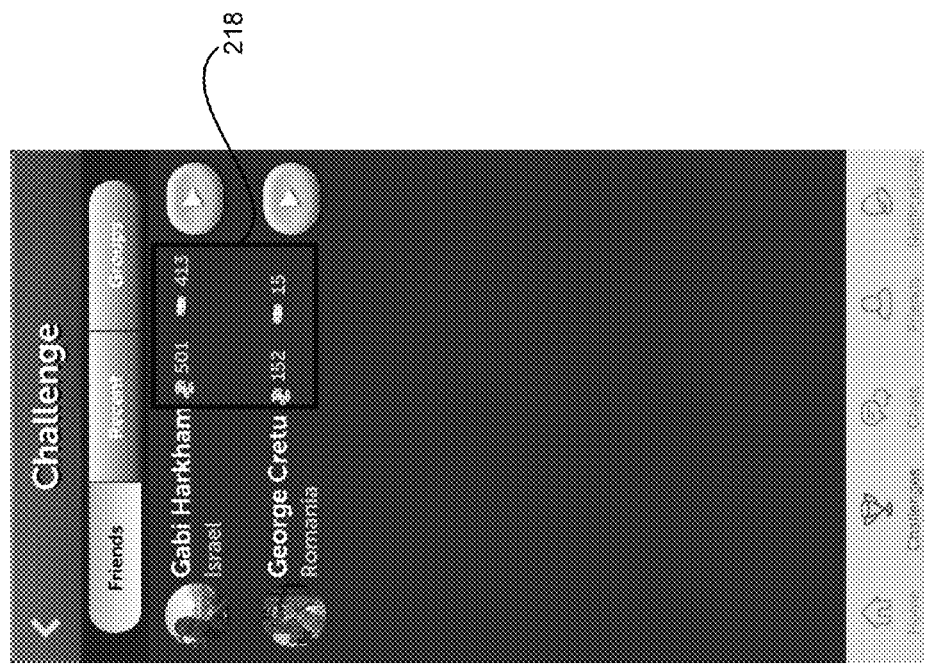

In the challenge, a user chooses the player to play against a priori, from a list of friends. Such a list is shown in the screenshot of FIG. 13. Optionally, next to the name of each player, the numbers and icons in the square 218 show the amounts and types of currencies that are available to each player. This enables the user to choose a suitable player to challenge in a wager for a desired amount of a desired currency.

At 702, a user's request to challenge a player according to specific game options is received by the server. At 704, the server forwards the request to the player. At 705, the server sends an activation signal to the user's gaming device to cause the game software on the user's gaming device to run. At 706 the server receives the user's score from the user's gaming device. At 707, the server starts a timer. At 708, a check is made to determine whether a predetermined time interval has expired. If the predetermined time interval has expired, the server sends a message to the user (optionally via a third party server), to inform the user that the player has not responded, at 710.

Figure 18:
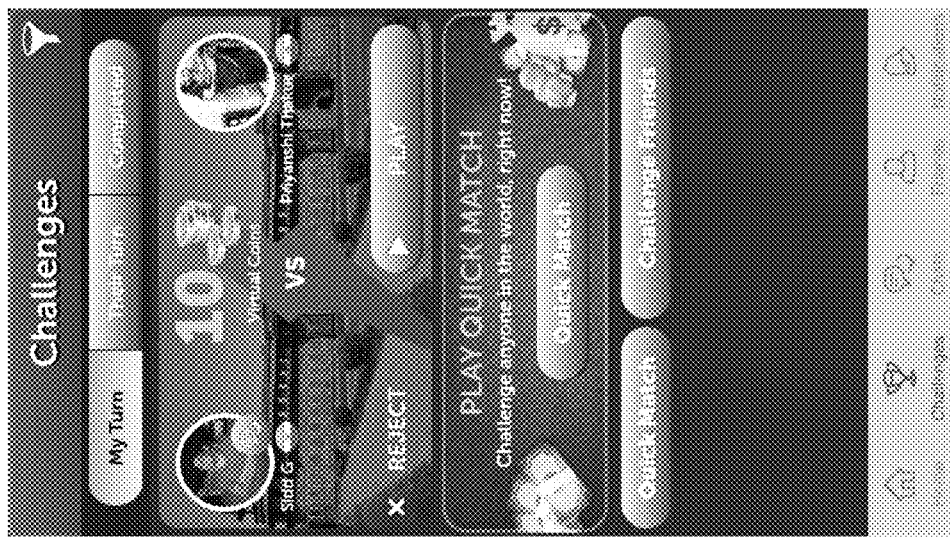

The request received by the player may look like the screenshot of FIG. 18, in which a virtual button 220 is present for enabling the player to reject the challenge, and a virtual button 222 is present for enabling the player to accept the challenge.

If the time interval has not expired at 708, a check is made at 712 to determine whether the player's response has been received. If no response has been received, the method loops back to step 708. If a response has been received, a check is made at 714 to check whether the request has been accepted. If the request is accepted, the server activates the game software to enable the player to play the game at 716. At 718, the server receives and records the score of the player. At 720, the score are compared and the winner is determined.

Figure 23:
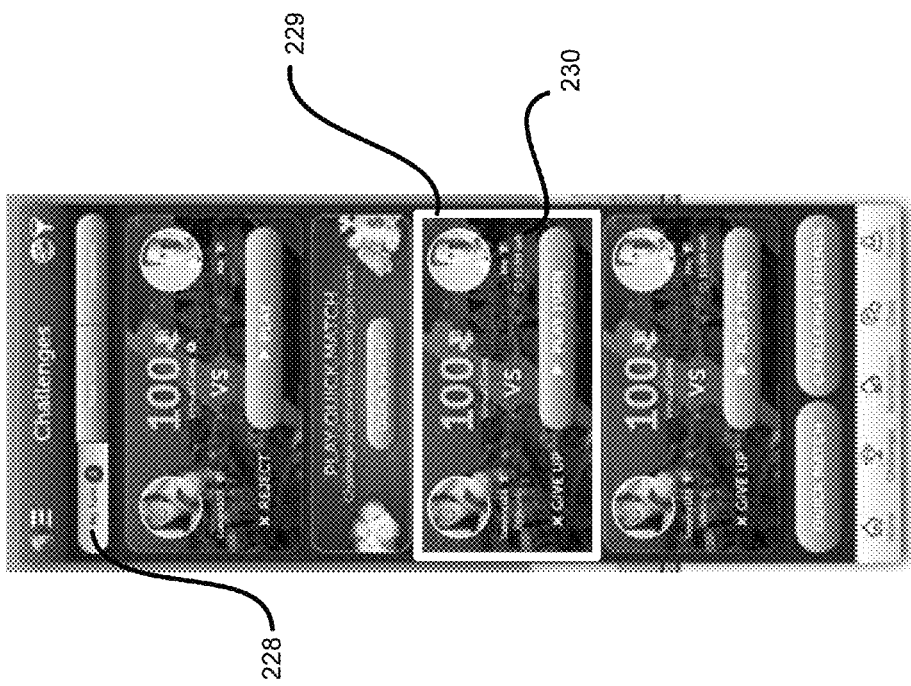

Optionally, the user and player play a match in which the user and player play multiple turns of a game. If this is the case, the winner is determined only at the end of the last turn. FIG. 23 shows a screenshot on the user's device illustrating a notification 229, showing that the user's own turn is to be played, as shown by the tab 228.

Figure 20:
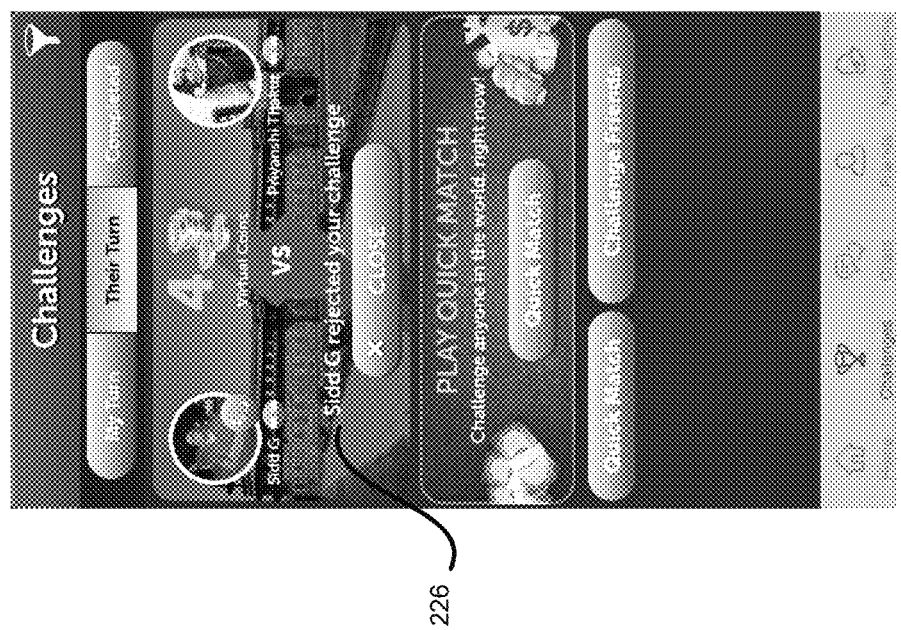

If the request of step 714 has not been accepted, the server sends to the user's device or to the third party website to which the user' device is connected a message notifying the user of the player's refusal. Such a rejection message 226 is shown in the screenshot of FIG. 20.

Figure 7:
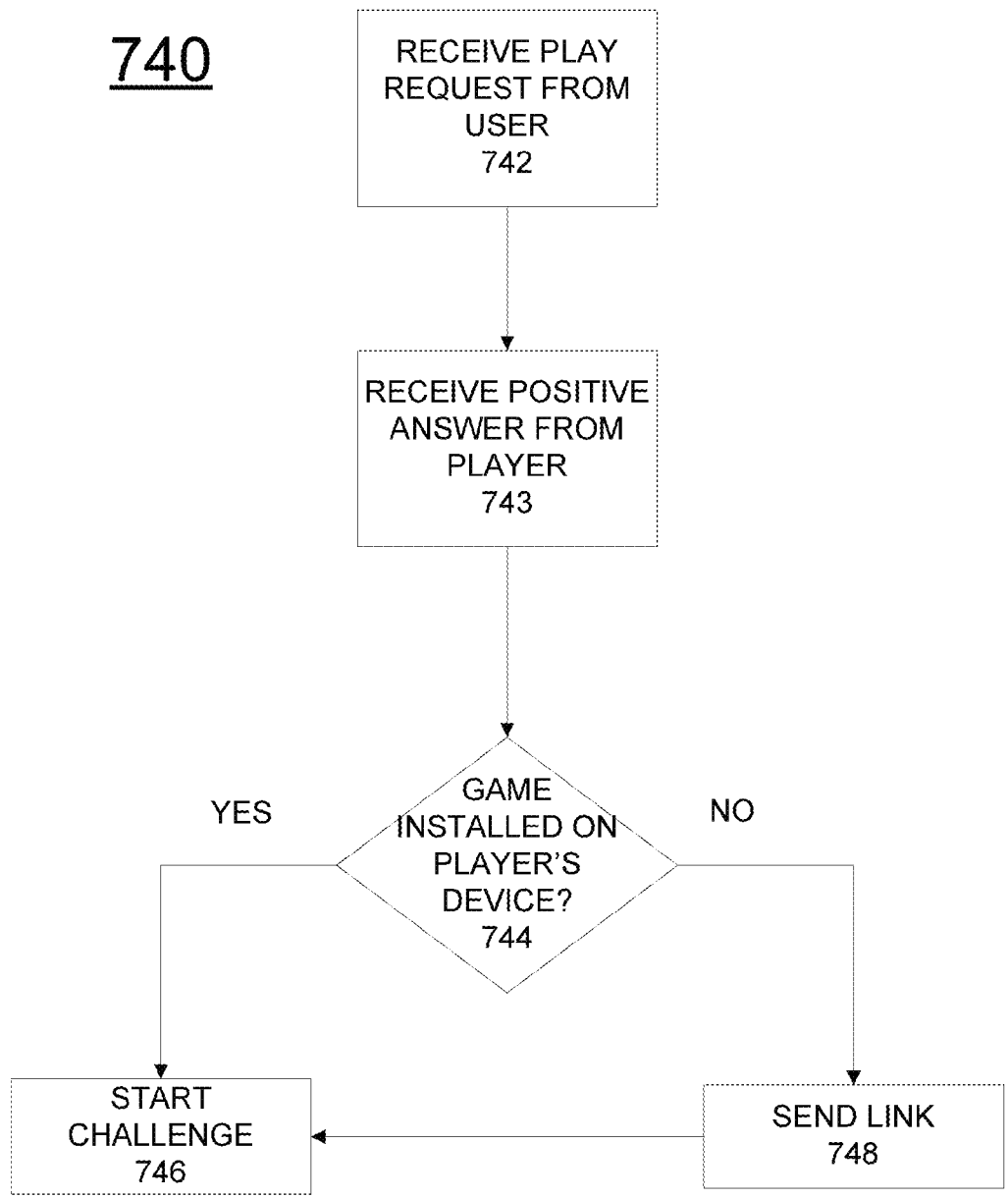
FIG. 7 is a flowchart illustrating a method of the present invention, for communicating a challenge from a user to a player, for a game that is installed on the user's device and may or may not be installed on the player's device.

FIG. 7 is a flowchart 740 illustrating a method of the present invention, for communicating a challenge from a user to a player, for a game that is installed on the user's device and may or may not be installed on the player's device.

In some embodiments of the present invention, the system of the present invention (as described in FIGS. 1-3) enables a user to challenge a player with a game that is not installed in the player's gaming device. In these embodiments, the server receives a challenge request from the user at 742. At 743, the server receives an acceptance from the player. As will be explained later, the acceptance message also includes data relating to the absence or presence of the game in the player's device. At 744, this data is analyzed to determine whether the game is installed in the player's gaming device.

If the game is installed in the player's device, the challenge is started at 746. Otherwise, at 748, the server sends the player's device a link to a site from which to download the game, for enabling installation of the game in the player's device. After the game is installed in the player's device, the challenge is started.

Figure 8A:
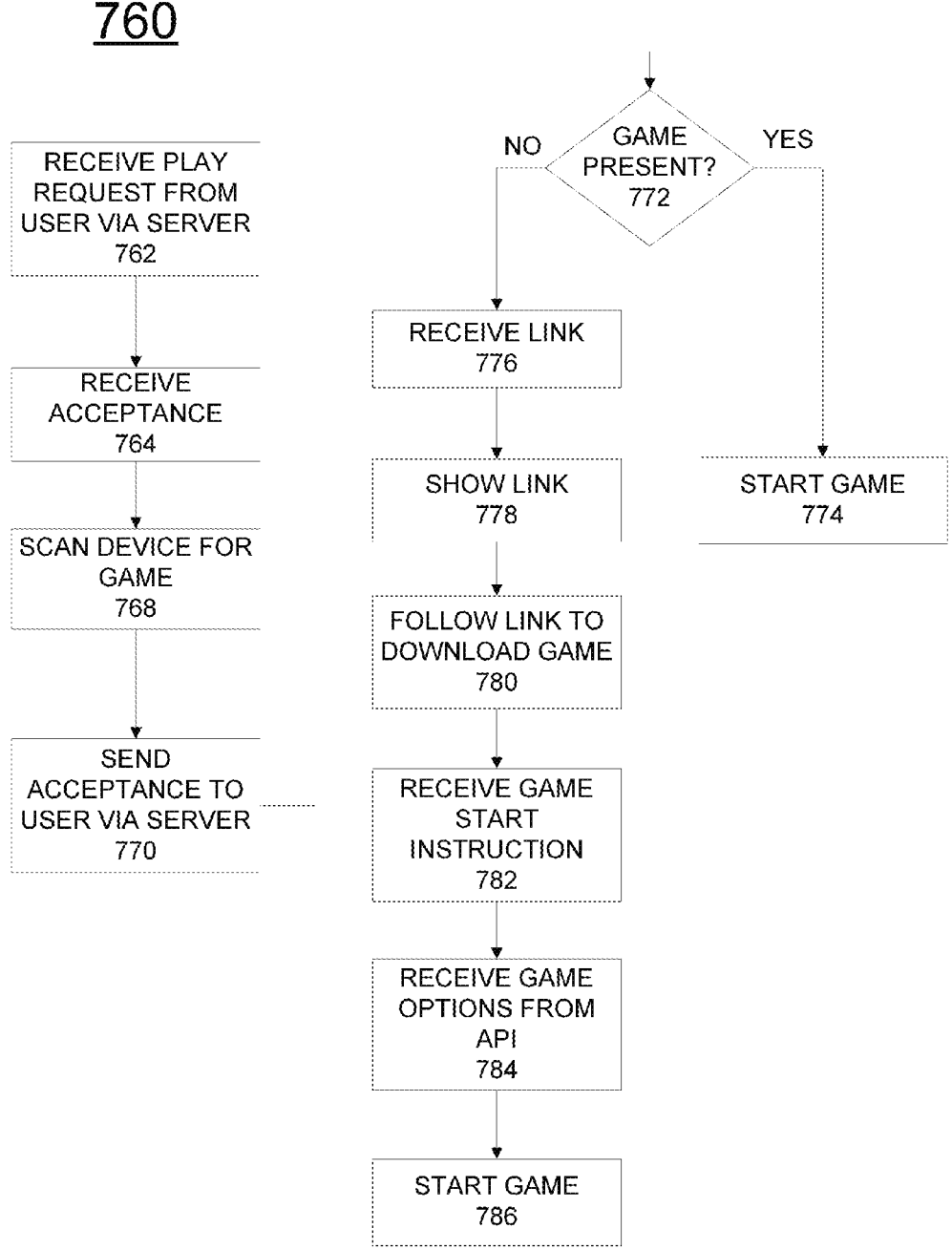
FIG. 8a is a flowchart illustrating a method of the present invention, for downloading a game on a device in response to the player's acceptance of a challenge in the game.

FIG. 8a is a flowchart 760 illustrating a method of the present invention, for downloading a game on a user's gaming device in response to the user's acceptance of a challenge in the game. The method of the flowchart 760 is performed by the player's gaming device.

At 762, the player's gaming device receives a request via the API for playing against the user using a game not installed therein. At 764, the gaming device receives an instruction from the player (via the API) to accept the challenge request. At 768, the API scans the device to determine whether the game is installed in the player's gaming device. Data indicative of the presence or absence of the game is sent to the server along with the acceptance message at 770.

At 772, a check is made to determine whether the game is installed in the gaming device. If the game is present, the gaming device receives an instruction from the player to start the game at 773, and the game is started at 774.

If the game is not present, the gaming device receives a link to a site for downloading the game at 776, displays the link to the player at 778, follows the link and downloads the game in response to the player's instruction at 780.

Once the game is downloaded, the player gives an instruction to the gaming device at 782 to start the game. On the player's gaming device, a the API runs on the background to keep the player's gaming device connected to the server. At 784, the API provides the game software with the game options set for the challenge. At 786, the game software runs on the processor of the player's gaming device according to the game options. By keeping the API active on the background, the data relating to the challenge is kept even if not game is running. Once the game is downloaded and instructed to start, the active API starts the challenge right away. In this manner, the player enters the challenge right away, and does not need to start the whole process of signing in, and challenging the user.

Figure 8B:
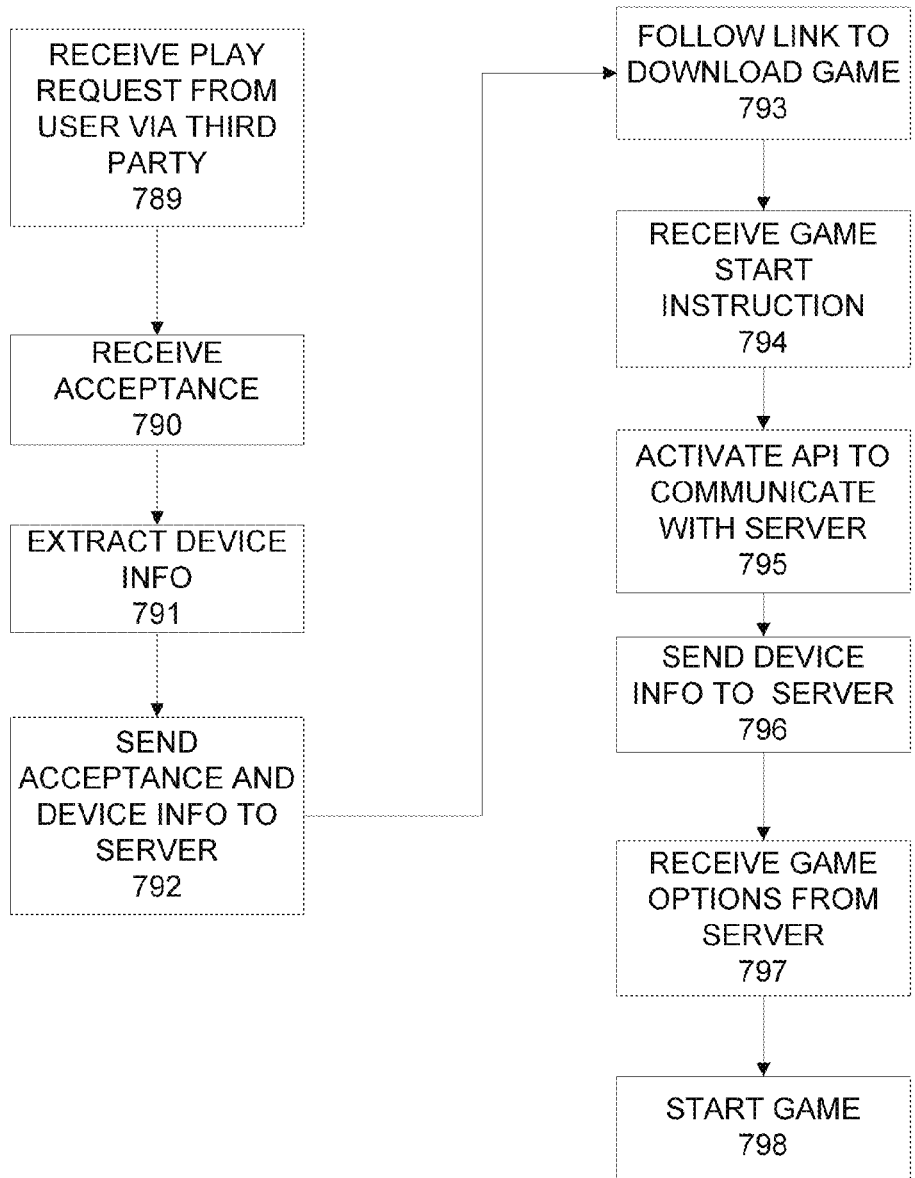
FIG. 8b is a flowchart illustrating a method of the present invention, for downloading a game on a player's gaming device in response to the player's acceptance of a challenge in the game, in the case in which the player is not signed up at the server.

FIG. 8b is a flowchart 788 illustrating a method of the present invention, for downloading a game on a player's gaming device in response to the player's acceptance of a challenge in the game. The method of the flowchart 788 is performed by the player's gaming device in the case in which the player is not signed up at the server.

At 789, the player's gaming device receives a challenge request using a game not installed therein. The request is delivered via a third party application, such as an email application, or an application is social media. At 790, the gaming device receives an instruction from the player (via the lounge application) to accept the challenge request. At 791, an identifier of the device is extracted. At 792, an acceptance response is sent to the server via the third party application along with the identifier of the player's device.

At 793, upon the device connects to a download link and downloads the game software and the embedded API software through the link. At 794, the player's device receives an instruction from the player to start the game. Together with the game software, the API is activated and communicates with the server at 795. The API extracts the identifier of the player's device and sends the identifier to the server at 796. The server compares the identifier sent from the API at 796 to the identifier sent through the third party server at 792. If the two identifiers match, the server sends the player's device game options associated with the challenge sent from the user to the player. The game options are received at 797, and the game is run according to the received game options at 798.

In this manner, even a user who uses the API for the first time can play the game right away, without having to first sign up. As mentioned before, the server creates a guest profile for the player. The player may at any time convert the guest account associated with the device to a player account associated with the player and independent on the device.

Figure 9:
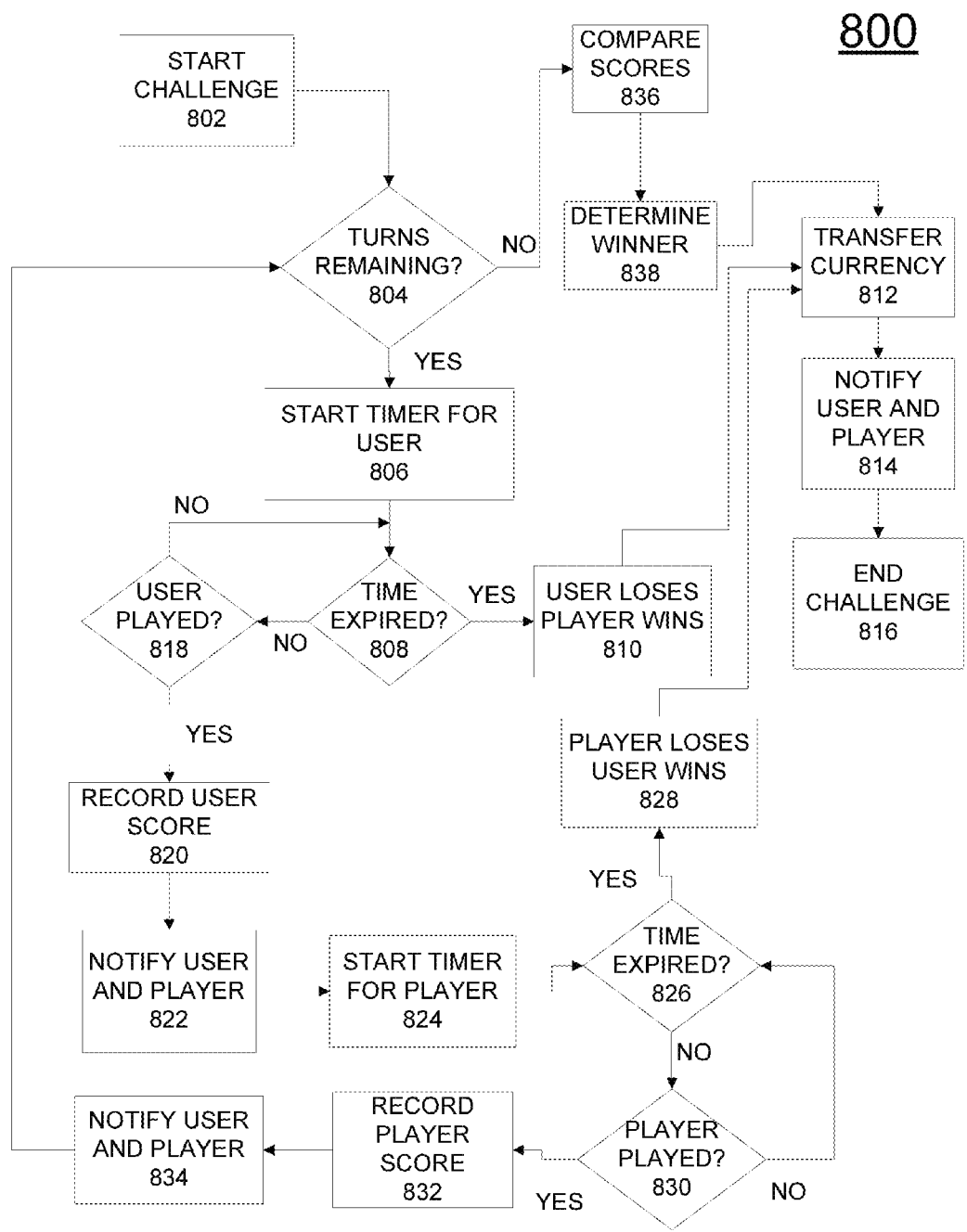
FIG. 9 is a flowchart is a flowchart illustrating a method of the present invention, for managing a challenge between users.

FIG. 9 is a flowchart 800 illustrating a method of the present invention, for managing a challenge between users. The method of flowchart 800 is performed by the server 116 of FIGS. 1-3.

Figure 22:
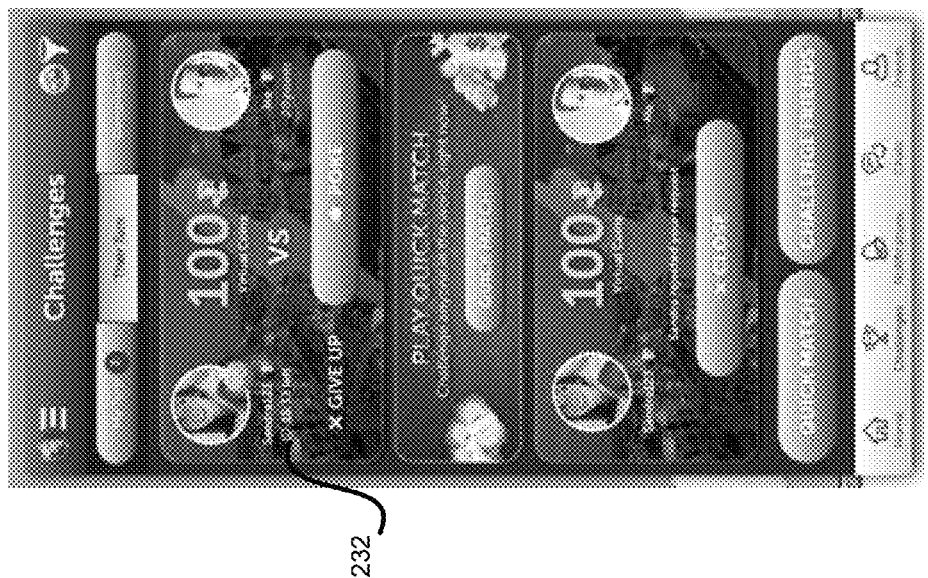

Once a challenge between a user and a player starts at 802, the server checks if any turns remain at 804. If at least one turn remains, a timer is started at 806 for the user to complete the user's turn. The server communicates the time left to the user's and the player's, as seen respectively in location 230 of the screenshot of FIG. 23 and in the location 232 of the screenshot of FIG. 22. A check is made at 808 to determine whether the time for the user to complete the user's turn has expired. If the time has expired, the user loses and the player wins at 810. Currency is transferred from the loser to the winner at 812, both user and player are notified of the end of the challenge at 814, and the challenge session is ended at 816.

If the time at 808 has not expired, a check is made to determine whether the user has played at 818. If the user has not played, the method loops back to the check 808. If the user has played, the user's score is recorded at 822, and the user and the player are notified that the user has played the user's turn. Optionally, the user's score is displayed in these notifications. Optionally, the server may update the user's score while the user is playing, so that the player can see the changes of the user's score in real-time or approximately in real time.

Figure 16:
Figure 19:
Figure 21:
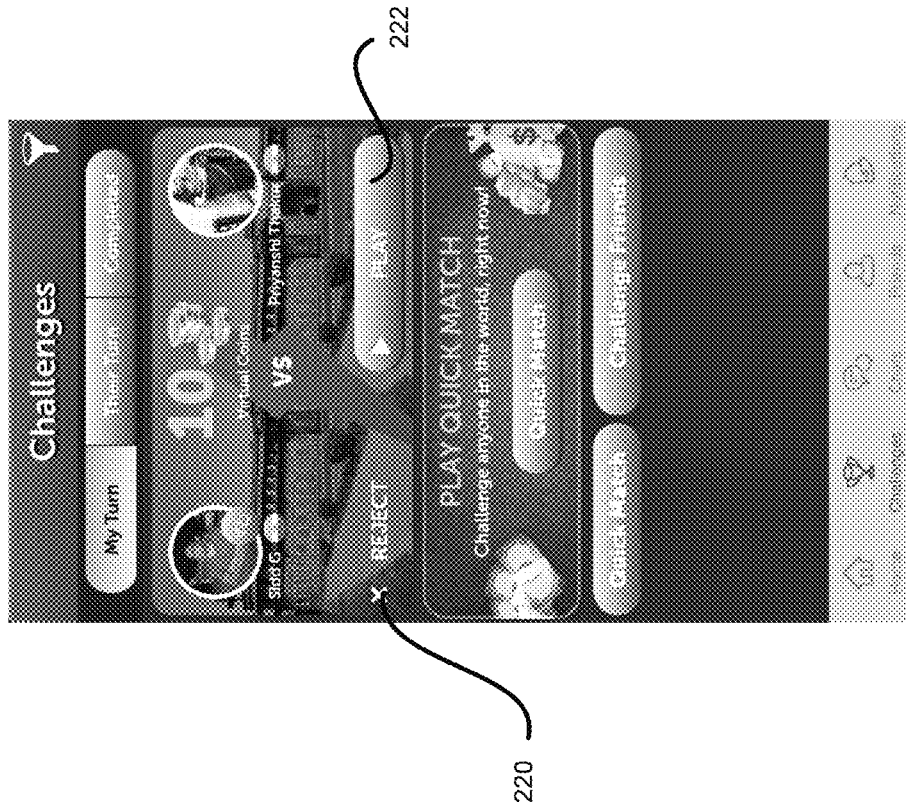

At 824, a timer is started for the player to complete the player's turn. At 826, a check is made to determine whether the time to complete the player's turn has expired. If the time has expired, the player loses and the user wins at 828, and steps 812-816 are performed. If the time has not expired, a check is made at 830 to determine whether the player has played the turn. If the player has not played, the method loops of the check at 826. If the player has played, the player's score is recorded at 832, the user and player are notified that the player has completed the player's turn, and the check at 804 is made to determine whether there are remaining turns. If no remaining turns are left, the scores are compared at 836, a winner is determined at 838 according to the score comparison and to game options set before the start of the challenge. Finally, steps 812-816 are performed, as described above. Screenshots displaying the notifications relating to the end of the challenge can be seen in FIGS. 16 and 19.

It should be noted that while most of the above description is related to gaming sessions between two players, the gaming sessions may be made between more than two players. FIGS. 27-32 relate to embodiments of the present invention in which systems and methods are provided for enabling a plurality of players to participate in tournaments.

Figure 27:
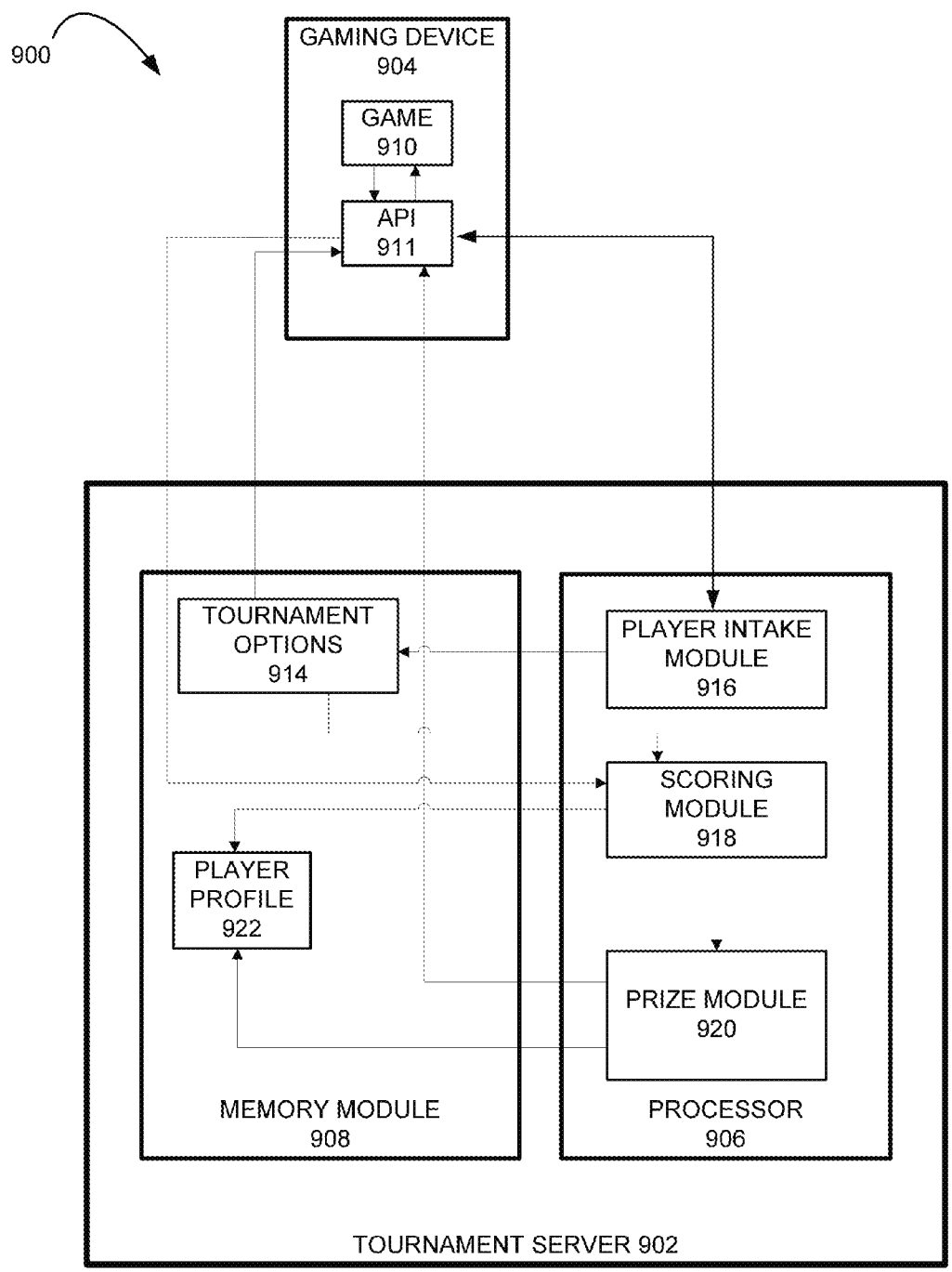
FIG. 27 is a box diagram illustrating a system of the present invention for enabling a player for joining a tournament, wherein the game is installed in the player's gaming device.

FIG. 27 is a box diagram illustrating a system 900 of the present invention for enabling a player for joining a tournament, wherein the game is installed in the player's gaming device.

The system 900 includes a tournament server 902 and a gaming device 904. The tournament server 902 includes a processor 906 and a memory module 908. The processor 906 is configured for running a player intake module 916, a scoring module 918, and a prize module 920. The memory module 908 is a non-volatile memory module configured for storing the tournament options 914 and the user profiles 922.

The gaming device 904 has a game application 910 and API 911 which is configured for enabling communication between the game application to server, as was the case in FIG. 1. The API 911 is not game-specific, and can be integrated with any game.

The game application 910 enables the player to play the game. The API 911 enables the player to enter a tournament, and enables to communicate with the tournament server 902.

The player uses the API 911 to contact the player intake module 916 and request to participate in a tournament. The player intake module 916 checks appropriate data from the tournament options 914 to determine if the player is eligible or not to participate in the tournament. If the player is not eligible, the player intake module sends a refusal message to the API. If the player is eligible the player intake module sends an acceptance message to the API. In some embodiments of the present invention the player intake module includes a security check, to determine the identity of the user, for example via a username and password. The player may be eligible, for example, if the player's device is located in permitted location designated by the tournament's organizer, and/or if the player has a profile and identifies himself/herself via a username and password, and/or if the player pays an entry fee, and/or if the player scans a tournament game card via the player's gaming device, and/or if the player enters a code printed on a game card, etc.

In some embodiments of the present invention, the player intake module 916 is configured for organizing players in groups. This is the case, for example, in the event that the tournament is an elimination tournament. An elimination tournament is a tournament having a plurality of stages. In each stage, players are grouped together in one or more groups of two or more players. In a stage, all players play their turn(s) and one or more players from each group are declared the winners of the stage according to the players' scores, and continue to the next stage. The players that are not declared winners of their group are eliminated from the tournament. The winner or winners of the last stage are the winners of the tournament.

If the player is accepted, the API is configured for connecting to the tournament options to extract appropriate data relating to the game options (difficulty level, map, etc., as described above), and—upon a player's instruction—to instruct the game application 910 to run the game according to the game options. Once the turn of the player is over, the API extracts the player's score and sends the score to scoring module 918.

A player's turn may be defined according to the choice of the game and to the desire of the tournament organizer. In some games, a turn may end at the end of a time interval, or when a condition is met (for example, when a player loses a "life" or reaches a certain location of a game's map). The score may be defined according to collected objects, a time it took the player to reach the location on the game's map, etc.

In a turn-based game (single player or multiplayer), the turn may end when a condition is met (e.g., a player defeated another player or a bot), or after a predetermined number of in-game turns is completed. The score may be defined, for example, according to points amassed at the end of the in-game turns, or according to whether the player has defeated the other player or a bot, etc.

In a real-time multiplayer game (single player or multiplayer), the turn may end when a condition is met (e.g., a player defeated another player or a bot), or after a predetermined time interval has passed. The score may be defined, for example, according to points amassed at the end of the time intervals, or according to whether the player has defeated the other player or a bot, etc.

The scoring module 918 receives the scores from all the players, and determines one or more winners. If the tournament includes more than one stage, the scoring module 918 determines the winner(s) of each stage, and the player intake module 916 organizes the stage's winners in new groups for the upcoming stage. This process is repeated until the last stage, at which the winner or winners are declared to be the overall winner or winners of the tournament. The scoring module optionally updates the player profiles 922 by adding data indicative of the player's participation and/or performance in the tournament.

The scoring module is configured for sending data indicative of the winners to the prize module 920. The prize module is configured for updating for sending a message to the tournament application instances 912 in the electronic device(s) of the winner(s) to inform the winner(s) that the winner(s) has (have) won a prize. Optionally, the prize can be redeemed by showing the message on the electronic device to an administrator of the tournament. Alternatively, an email message or SMS message is sent to the winner(s) with a link to a third party website for receiving the prize. In another variant, the prize module will add an amount of currency to the player's profile, to enable the player to redeem a prize by spending currency.

Figure 28:
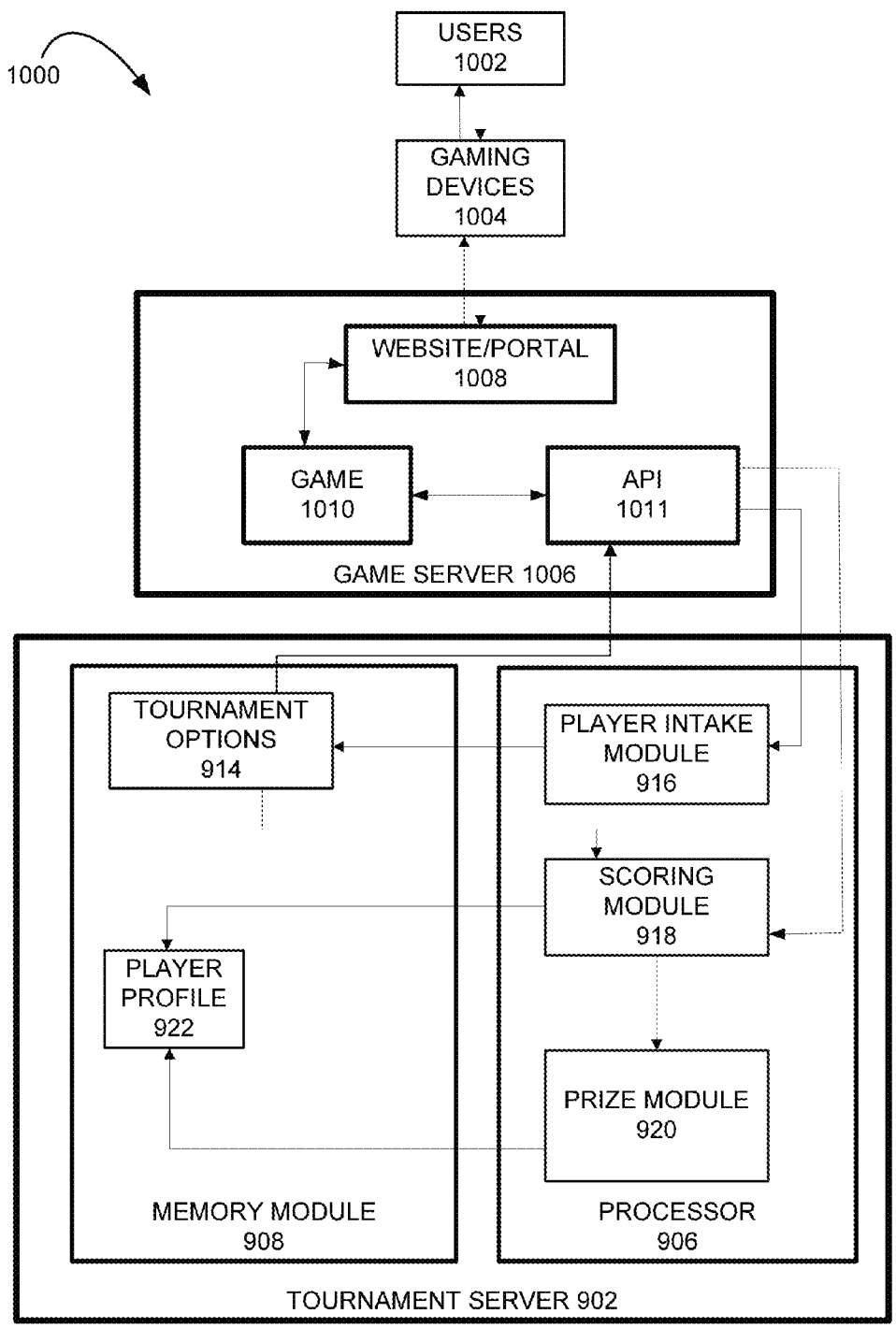
FIG. 28 is a box diagram illustrating a system of the present invention for enabling a player for joining a tournament, wherein the game is installed in a server that is remote from the player's gaming device.

FIG. 28 is a box diagram illustrating a system 1000 of the present invention for enabling a player for joining a tournament, wherein the game is installed in a server that is remote from the player's gaming device.

In the system 1000, the user 1002 uses a gaming device 1004 to contact a game server 1006. The game server 1006 is similar to the third party server of FIG. 2. The game server 1006 is configured for storing and running a website/portal 1008 for establishing connection with game device, a game application 1010 configured for enabling the game to be played remotely, and an API tournament application 1011, configured for enabling communicating between the game application and the tournament server 902 described above.

The operation of the tournament application, game software, and tournament server is the same as described above in FIG. 7.

Figure 29:
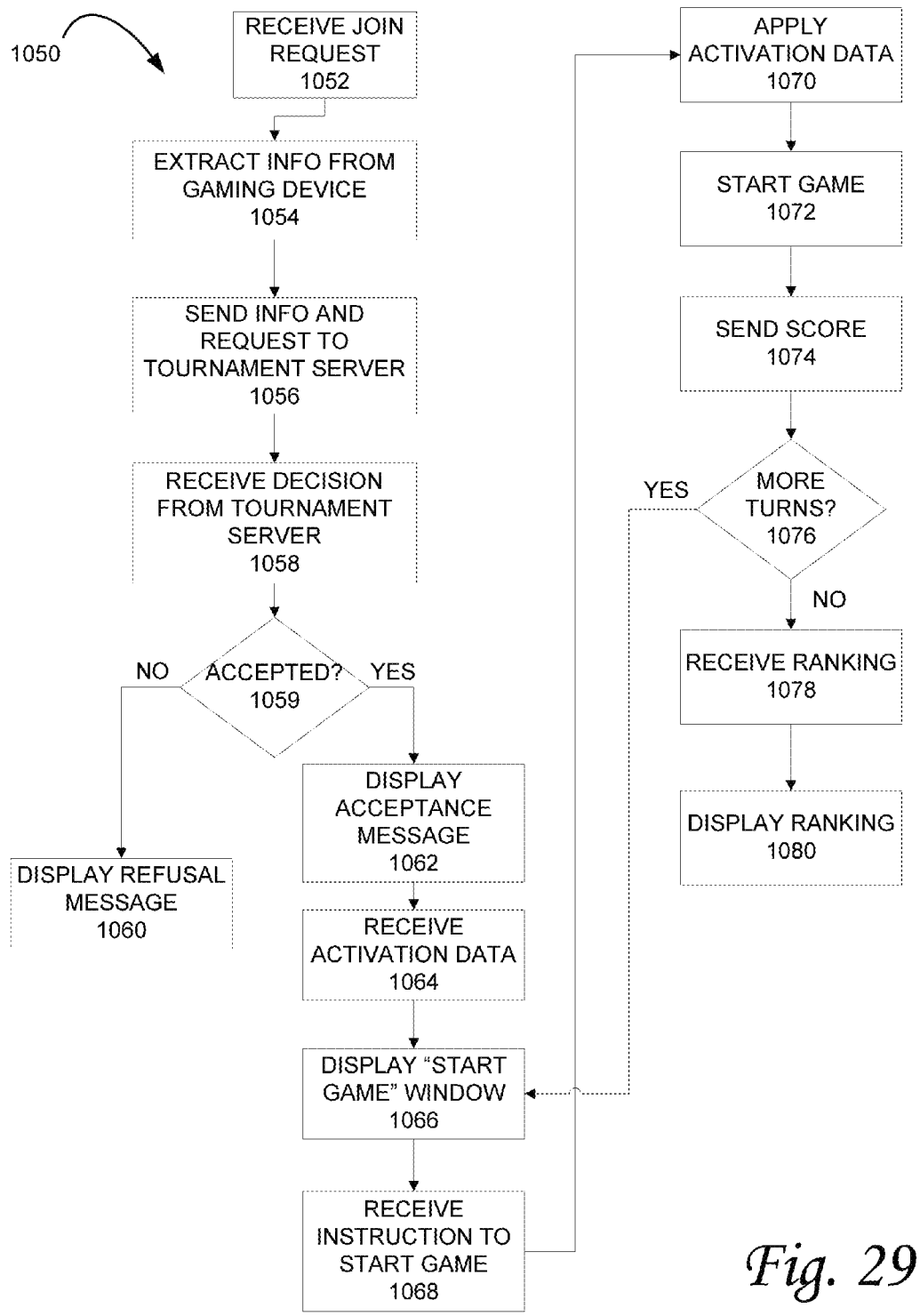
FIG. 29 is a flowchart illustrating a method performed by an application installed on a gaming device or a game's server accessible to the gaming device, for enabling a player to join a tournament, according to some embodiments of the present invention.

FIG. 29 is a flowchart 1050 illustrating a method performed by a tournament application installed on a gaming device or a game's server accessible to the gaming device, for enabling a player to join a tournament, according to some embodiments of the present invention;

At 1052, the gaming device receives the player's request to join a tournament. Optionally, the API extracts information relating to the device at 1054 (e.g., an identifier, a location, etc.). At 1056, the request to join and the device's info is sent to the tournament server described in FIGS. 27 and 28. At 1058, the decision from the tournament server is received. The tournament's decision may be based on the player's location, on the payment of an entry fee, and other factors set by the tournament organizer prior to the start of the tournament. At 1059, a check is made to determine whether the request has been accepted. If the request is refused, a refusal message is displayed at 1060. If the request is accepted, an acceptance message is displayed at 1062.

At 1064, activation data from the tournaments server is received. The activation data is configured for setting the game to operate according to game options set by the tournament organizer (e.g. difficulty level, map, turn length, etc.). At 1066, a "start game" window is displayed on the screen of the gaming device by the API. At 1068 an instruction to start the game is received from the player by interacting with the window. At 1070, the activation data is applied to the game by the API. At 1072, the game is started.

The game score is extracted from the game application via the API and sent to the tournament server at 1074. At 1076, a check is made to determine if the player has to play more turns. If there is at least one remaining turn, the method is repeated from the step 1066. If no turns remain, a ranking is received from the tournament server at the end of the tournament at 1078. At 1080, the ranking is displayed.

Figure 30:
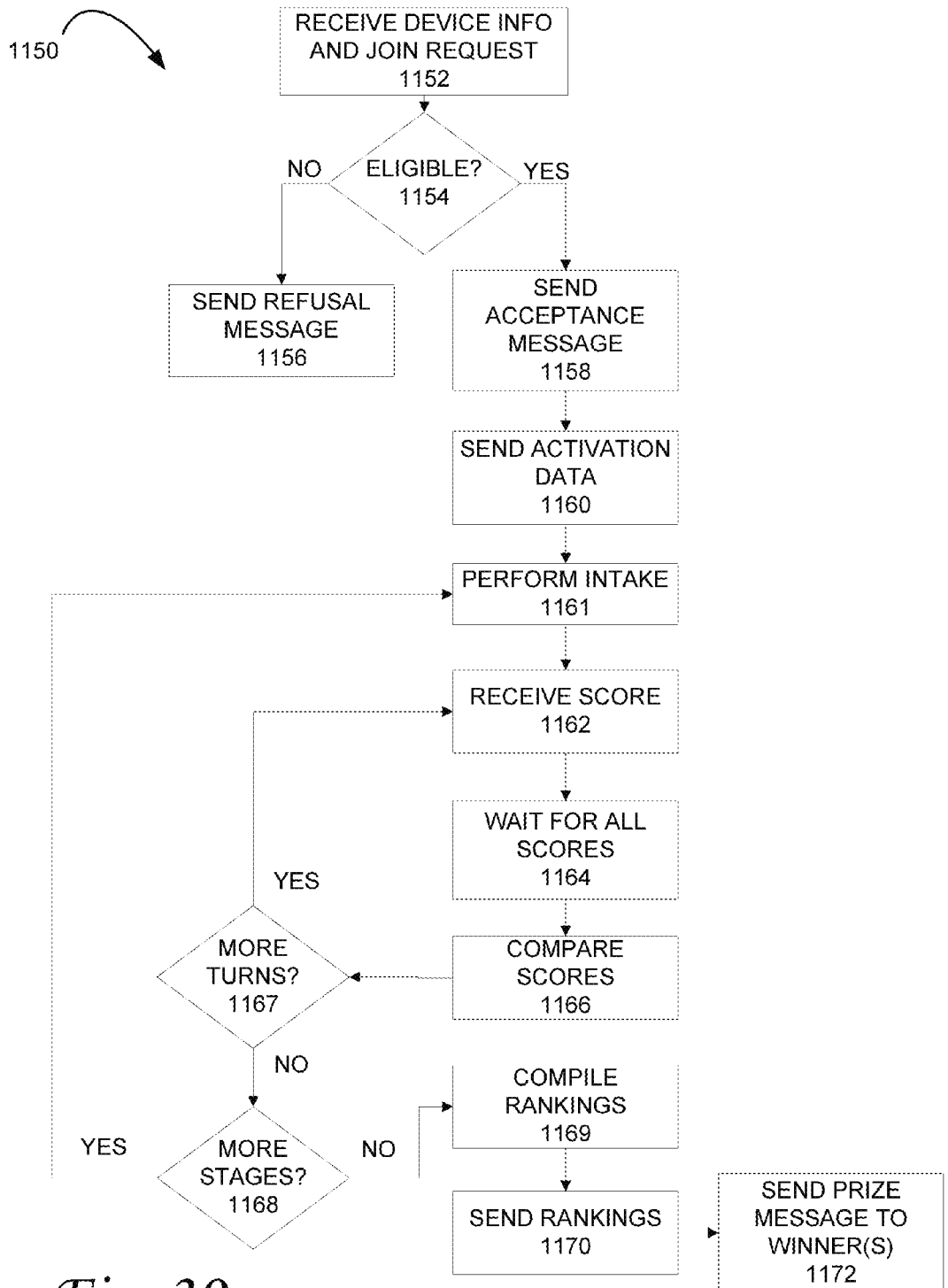
FIG. 30 is a flowchart illustrating a method performed by a tournament server, for managing a tournament, according to some embodiments of the present invention.

FIG. 30 is a flowchart 1150 illustrating a method performed by a tournament server, for managing a tournament, according to some embodiments of the present invention.

At 1152, a request to join the tournament is received, along with device information (if present). At 1154, a check is made to determine whether the player is eligible to participate in the tournament. If the player is not eligible a refusal message is sent at 1156. Optionally, the refusal message may contain information relating to the reason for refusal (e.g. player cannot pay entry fee, player's device is too far from a predetermined location, etc.).

If the player is eligible, an acceptance message is sent at 1158, and activation data (if present) is sent at 1160. As explained above activation data relates to the settings at which a game is to be played. At 1161, the player's intake is performed. The player's intake may include creating a temporary profile of the player for the tournament, and may also include crating one or more groups of players for a first stage, as explained above.

At 1162, a score is received from a player. At 1164, the server waits until the end time of the tournaments to receive scores from all players. At 1166, the score are compared. At 1167, a check is made to determine whether any more turns are to be played by the players. If more turns are to be played, the process loops to step 1162, and scores are received for the next turn. When checking for additional turns, the check is made by comparing the number of turns that have been played to a predetermined number of turns chosen by the organizer, or by comparing the time that has lapsed since the intake to a predetermined time interval.

If no more turns are to be played, a check is made at 1168 to determine whether more stages are to be played. If more stages are to be played, the intake is performed at 1161 with the remaining players.

If all stages have finished, the final rankings are compiled at 1169. At 1170 the rankings are sent to the gaming devices of the participants. At 1172, one or more messages are sent to the one or more winners, to inform the winners that they have won a prize. The message may include information on how to claim the prize.

It should be noted that the API of FIGS. 1-3, may be integrated with the API of FIGS. 27 and 28 in a single application that enable players to play against each other and to participate in tournaments. Similarly, the PVP server of FIGS. 1-3 may be integrated with the tournament server of FIGS. 27 and 28 into a single server.

In some embodiments of the present invention, the connection between the player's gaming device and the server that enables the player to play a game against another player or the server that enables the player to participate in a tournament is made when the user's gaming device is moved according to a certain pattern. FIGS. 33 and 34 relate to such embodiments.

Figure 31:
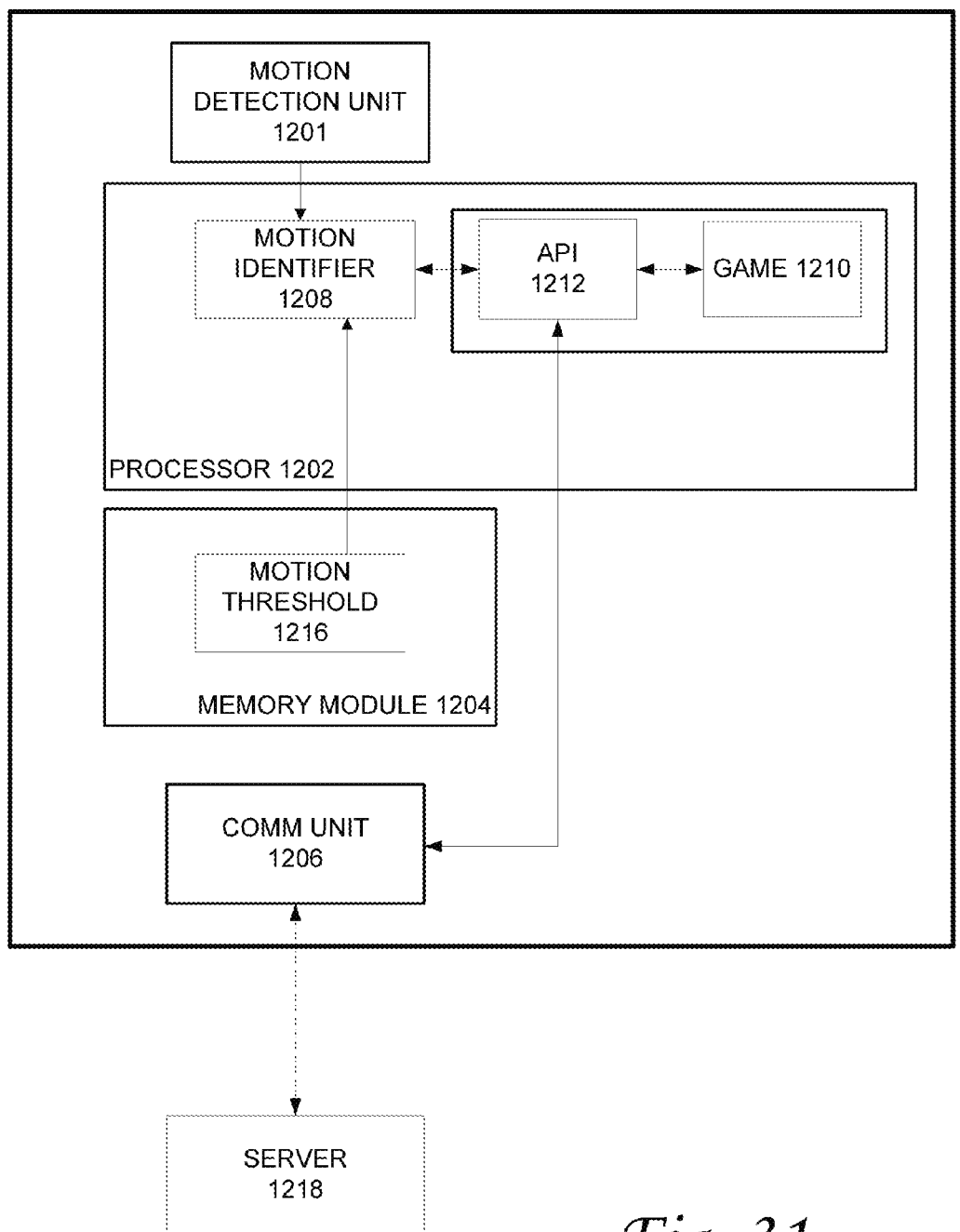
FIG. 31 is a box diagram illustrating a portable gaming device configured for connecting to a server for playing a tournament or enabling a player to play against another player when the portable gaming device is moved according to a certain pattern, according to some embodiments of the present invention.

FIG. 31 is a box diagram illustrating a portable gaming device configured for connecting to a server for playing a tournament or enabling a player to play against another player when the portable gaming device is moved according to a certain pattern, according to some embodiments of the present invention.

The portable gaming device 1200 includes a motion detection unit 1201, a processor 1202, a non-volatile memory module 1204, and a communication unit 1206. The processor 1202 is configured for running motion identifier software 1208, game software 1210, and an API software 1212. The memory module 1204 is configured for storing data relating to a motion threshold 1216.

The motion detection unit 1201 includes one or more sensors, such as accelerometers, gyroscopes, and other elements that can be used in a portable gaming device, such as smart phone, and is configured for detecting a motion of the gaming device 1200, and output motion data. The processor 1202 is configured for receiving the motion data and process the motion data by running the motion identifier software 1208, in order to identify a certain motion pattern (e.g. a shake) of the gaming device 1200. The motion identifier software 1208 is configured for comparing one or more properties of the motion data to one or more corresponding properties of the motion threshold data 1216. The properties in the motion data and the motion threshold data may be indicative one or more of: velocity, acceleration, frequency, etc. Via the comparison, the motion identifier 1208 determines whether the motion of the gaming device 1208 is a certain predetermined motion.

In order to activate the motion identifier software 1208, a game software 1210 is launched first. The game software 1210 is integrated with an API 1212, which is configured for activating the motion identifier software 1208. When the motion identifier 1208 identifies the predetermined motion, the motion identifier sends a control signal to the API, and the API establishes communication a server 1218, which may be similar to the PVP server of FIGS. 1-3, the tournament server of FIGS. 27-28, or a server that can operate both as a PVP server and as a tournament server. As explained above, the API allows the player to send to the server a request to play against another player and/or a request to participate in a tournament, and enables a player to receive data for the player to view. As mentioned above, the API enables communication between the game software 1210 and the server, for example for transmitting a score to the server, and/or transmitting activation data to the game software in order to configure the game software to run in a selected mode (difficulty level, a specific map, etc.).

The communication unit 1206 is a unit that is configured for communicating with the server via a cellular network and/or an internet network (WiFi, BlueTooth, etc.).

As mentioned above with reference to FIGS. 1-3, 27 and 28, in some embodiments of the present invention, the API code is not specific to any game and can be added to any game code.

Figure 32:
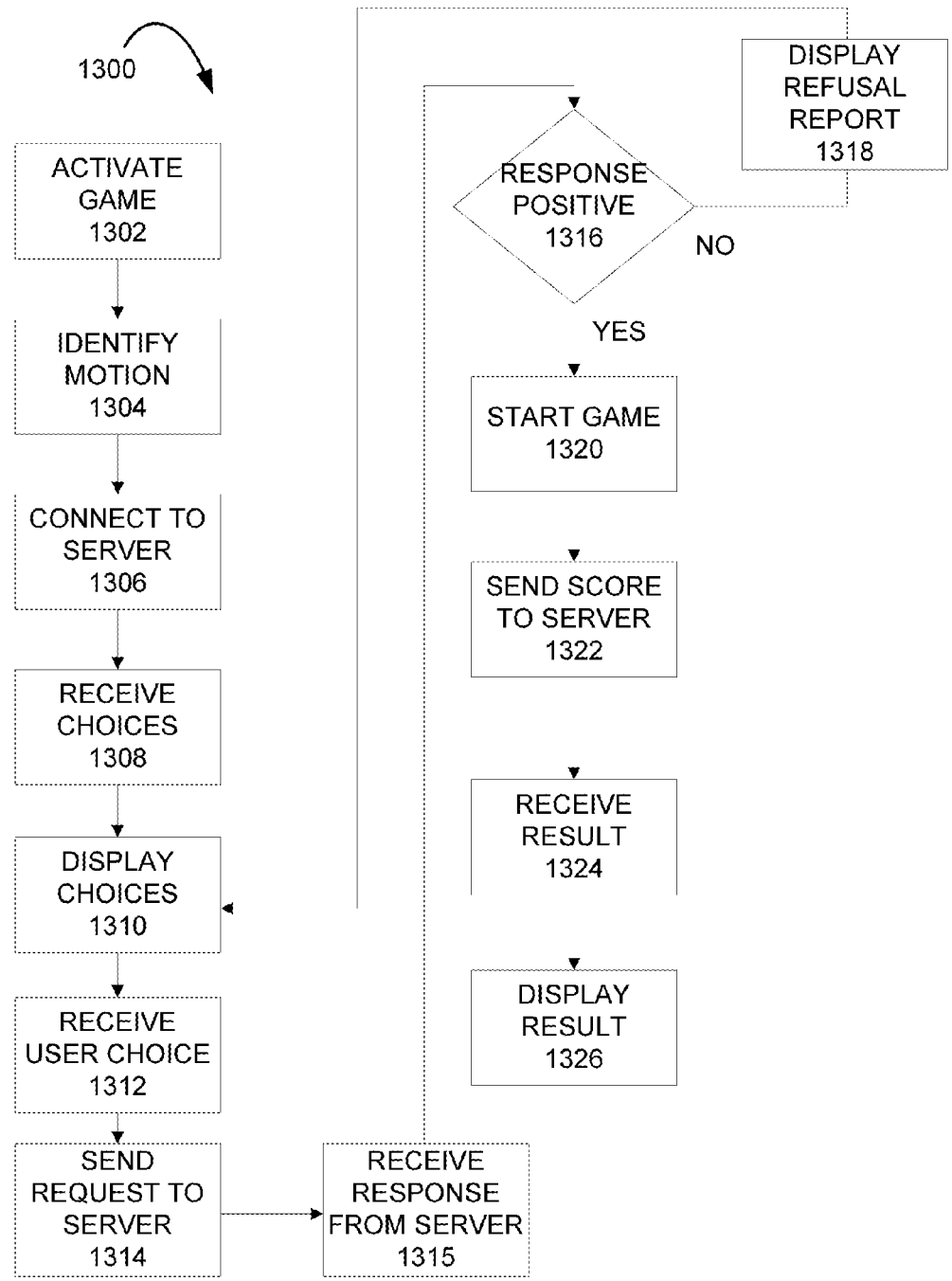
FIG. 32 is a flowchart illustrating a method of the present invention for connecting a portable gaming device to a server for playing a tournament or enabling a player to play against another player, by moving the portable gaming device according to a certain pattern.

FIG. 32 is a flowchart 1300 illustrating a method of the present invention for connecting a portable gaming device to a server for playing a tournament or enabling a player to play against another player, by moving the portable gaming device according to a certain pattern.

At 1302, the game software is activated to run on the processor in response to the player's instruction. The predetermined motion (e.g., shake) is identified while the game is open, at 1304. The gaming device connects to a remote server, and receives therefrom data indicative of the choices that are available to the player, i.e. a list of the available tournaments to participate it, and/or a list of available players, and/or an option to challenge a random player, and/or conditions for entering the game (such as an entry fee and a prize) at 1308. These choices are displayed to the player via the lounge application described above at 1310, prompting the player to choose from the list.

Once the gaming device receives the player's choice on how to play the game at 1312, the gaming device sends a request to the server at 1314 to play according to the player's choice. The gaming device receives a response to the user's request at 1315.

A check is made at 1316 to determine whether the response is positive or negative. If the response is negative, a refusal report is displayed at 1318, optionally explaining the reason for the refusal to challenge a player or to join a tournament, and the gaming options are displayed again at 1310. If the response is positive, the mobile device enables the user to start the game at 1320, for example via a virtual button generated by the API. When the user has finished the game, the API in the gaming device sends the score to the server at 1322. At the end of the challenge or tournament, the final result of the challenge or the tournament is sent by server and received by the gaming device at 1324, and is displayed by the gaming device at 1326 via the API.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for enabling a first player to play an electronic game against at least one second player, the system comprising:
    an application programming interface (API) software integrated with a software of the electronic game, the API software being configured being stored in non-volatile memory module of a computing device and for being run by a processor of the computing device, the API being configured for causing the computing device to:
    receive a request from a user associated with the computing device to play the electronic game against at least one second player;
    send the request to a server which is configured for matching the user against the at least one second player and hosting a competition between the first player and the at least one second player;
    receive data from the server and generating one or more screens indicative of the received data, the one or more screens being configured for being displayed on a display associated with the computing device;
    receive an instruction from the server to run the game software;
    run the game software in response to the instruction;
    extract a score achieved by the user at an end of a playing session;
    send the score to the server;
    wherein a code of the API software is not game specific and is configured for being integrated with a code of any game configured for running on the processor of the gaming device;
    wherein the competition comprises at least one of: a gaming session between two players, a gaming session between more than two players, and a tournament;
    wherein the API is configured for being stored in and run by a plurality of computing devices to create a plurality of API instances;
    wherein:
        the server comprises a server processor and a server non-volatile memory module;
        the server processor is configured for:
            matching the first player against the at least one second player in a competition, according the request sent by a first computing device associated with the first player via a first instance of the API software;
            receiving the score of the first player from the first computing device and for receiving at least one score of the at least one second player from at least one second computing device associated with the at least one second player via at least a second API instance, for comparing the received scores, and for determining a winner according to the received scores;
transferring currency between the first player and the at least one second player, according to the determination of the winner;
the server non-volatile memory module is configured for storing:
game options data, configured for being created for each gaming session by the server processor upon matching the players, according to one or more details provided by a tournament organizer;
profiles of the first player and of the at least one second player, configured for being updated by the server processor upon currency transfer.

2. The API software of claim 1, further configured for causing the computing device to:
display a virtual button on a screen generated by the game software;
connect to the server, upon a selection by the user of the virtual button.

3. The API of claim 1, wherein the computing device is a portable gaming device which comprises a motion detection unit and motion identifier software, the motion detection unit being configured for detecting one or more parameters relating of the motion of the gaming device and outputting motion data indicative of the one or more parameters, and the motion identifier software being configured for receiving the motion data from the motion detector, processing the motion data to determine whether a predetermined motion occurs and generating a control signal when the predetermined motion is identified, the API being configured for causing the computing device to:
activate the motion identifier software for running on the processor when the game software runs on the processor; and
connect to the server, upon generation of the control signal.

4. The API of claim 3, wherein the predetermined motion comprises at least one of: a translation of the portable gaming device, a rotation of the portable gaming device, and a motion pattern comprising a plurality of translations and/or of rotations of the gaming device.

5. The API of claim 1, wherein the computing device is a gaming device proximal to the first player and the one or more screens are configured for being displayed on a display associated with the gaming device.

6. The API of claim 1, wherein the computing device is a second server configured for being accessed remotely by the first player via a gaming device of the user, wherein the one or more screens are configured for being displayed on a display associated with the first player's gaming device.

7. The system of claim 1, wherein the game options data comprises one or more data pieces relating to one or more settings of the game chosen for the competition, such that the server is configured for sending the one or more data piece to each computing device associated with each player, so as to cause the game software to run on each computing device's processor according to chosen settings.

8. The system of claim 1, wherein the game options data comprises one or more data pieces relating to at least one of: an amount of currency wagered by the user and the one or more players, a difficulty level of the game, a map of the game, a number of turns to be played.

9. The system of claim 1, wherein the server processor is configured for matching the first player with one or more random players and starting the competition.

10. The system of claim 1, wherein:
at an end of the competition, the server is configured for generating a signal indicative of the competition's end and for sending the signal to computing devices associated with the players;
responsive to the signal, each of computing devices is configured for generating data indicative of a prompt image, the prompt image being configured for being displayed to the players for enabling at least one of the players to request a rematch competition.

11. The system of claim 10, wherein:
when the prompt is selected by the first player, the first computing device is configured for opening a request window to enable the user to change at least one game option for the rematch competition;
when the user completes filling the request window, the first computing device is configured for sending the server a rematch request via the first API instance according to the filling of the request window;
the server is configured for sending the rematch request to the at least one second computing device.

12. The system of claim 1, wherein the first computing device running the first API instance is configured for enabling the user to request from the server to compete against a predetermined friend associated with the user.

13. The system of claim 12, wherein the first computing device running the first API instance is configured for enabling the first player to request from the server to compete against the predetermined friend choosing a game that is not installed in the friend's computing device.

14. The system of claim 13, wherein:
a friend's computing device running a friend's API instance is configured for determining whether the chosen game is present in the friend's computing device, and for sending the server a response to the user request along with information regarding a presence of the chosen game;
if the server receives an acceptance to the request and the information indicates that the chosen game is not present in the friend's computing device, the server is configured for sending to the friend's computing device a link to a location at which the chosen game can be downloaded.

15. The system of claim 1, wherein:
the server comprises a server processor and a server non-volatile memory module;
the server processor is configured for:
performing an intake of a plurality of players by processing requests sent by the plurality computing device running corresponding API instances, and accepting or rejecting each request based on at least one predetermined instruction;
receiving the scores of the accepted players, sent by computing devices associated with the accepted players and running corresponding API instances, comparing the scores, and determining one or more winners according to the scores;
sending one or more notifications to the one or more winners via respective API instances or via an external communication system, to inform the winners that a prize is due to each winner, the notification containing information on how to claim the prize.

16. A system for enabling a user to play an electronic game against one or more players, the system being configured being stored in non-volatile memory module of a computing device and for being run by a processor of the computing device, the computing device being a portable gaming device which comprises a motion detection unit configured for detecting one or more parameters relating of the motion of the gaming device and outputting motion data indicative of the one or more parameters, the system comprising:

API software being configured being stored in non-volatile memory module of the computing device and for being run by the processor of the computing device, the API being configured for causing the computing device to:
        receive a request from a user associated with the computing device to play the electronic game against at least one second player;
        send the request to a server which is configured for matching the user against the at least one second player and hosting a competition between the first player and the at least one second player;
        receive data from the server and generating one or more screens indicative of the received data, the one or more screens being configured for being displayed on a display associated with the computing device;
        receive an instruction from the server to run the game software;
        run the game software in response to the instruction;
        extract a score achieved by the user at an end of a playing session;
        send the score to the server;
    and
    motion identifier software configured for:
        being activated by the API for running on the processor when the game software runs on the processor;
        causing the processor to receive the motion data from the motion detector;
        causing the processor to process the motion data to determine whether a predetermined motion occurs;
        upon identifying the predetermined motion, causing the processor to activate the API to connect to the server;
    wherein the competition comprises at least one of: a gaming session between two players, a gaming session between more than two players, and a tournament.

17. The system of claim 16, wherein a code of the API software is not game specific and is configured for being integrated with a code of any game configured for running on the processor of the gaming device.

18. The system of claim 16, wherein the predetermined motion comprises at least one of: a translation of the portable gaming device, a rotation of the portable gaming device, and a motion pattern comprising a plurality of translations and/or of rotations of the gaming device.

19. A system for enabling a first player to play an electronic game against at least one second player, the system comprising:

an application programming interface (API) software integrated with a software of the electronic game, the API software being configured being stored in non-volatile memory module of a computing device and for being run by a processor of the computing device, the API being configured for causing the computing device to:
        receive a request from a user associated with the computing device to play the electronic game against at least one second player;
        send the request to a server which is configured for matching the user against the at least one second player and hosting a competition between the first player and the at least one second player;
        receive data from the server and generating one or more screens indicative of the received data, the one or more screens being configured for being displayed on a display associated with the computing device;
        receive an instruction from the server to run the game software;
        run the game software in response to the instruction;
        extract a score achieved by the user at an end of a playing session;
        send the score to the server;
    wherein a code of the API software is not game specific and is configured for being integrated with a code of any game configured for running on the processor of the gaming device;
    wherein the competition comprises at least one of: a gaming session between two players, a gaming session between more than two players, and a tournament;
    wherein the API is configured for being stored in and run by a plurality of computing devices to create a plurality of API instances;
    wherein:
        the server comprises a server processor and a server non-volatile memory module;
        the server processor is configured for:
            matching the first player against the at least one second player in a competition, according the request sent by a first computing device associated with the first player via a first instance of the API software;
            receiving the score of the first player from the first computing device and for receiving at least one score of the at least one second player from at least one second computing device associated with the at least one second player via at least a second API instance, for comparing the received scores, and for determining a winner according to the received scores;
            transferring currency between the first player and the at least one second player, according to the determination of the winner;
        the server non-volatile memory module is configured for storing:
            game options data, configured for being created for each gaining session by the server processor upon matching the players, according to one or more details in the first player's request;
            profiles of the first player and of the at least one second player, configured for being updated by the server processor upon currency transfer.

* * * * *